(12) United States Patent
Rolia et al.

(10) Patent No.: US 8,543,711 B2
(45) Date of Patent: Sep. 24, 2013

(54) SYSTEM AND METHOD FOR EVALUATING A PATTERN OF RESOURCE DEMANDS OF A WORKLOAD

(75) Inventors: Jerome Rolia, Fort Collins, CO (US); Daniel Gmach, Fort Collins, CO (US); Ludmila Cherkasova, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1385 days.

(21) Appl. No.: 11/742,519

(22) Filed: Apr. 30, 2007

(65) Prior Publication Data

US 2008/0271038 A1   Oct. 30, 2008

(51) Int. Cl.
*G06F 15/16* (2006.01)

(52) U.S. Cl.
USPC .......................................... 709/229

(58) Field of Classification Search
USPC .................. 709/217, 224, 226, 229
See application file for complete search history.

(56) References Cited

U.S. PATENT DOCUMENTS

| | | | |
|---|---|---|---|
| 5,668,995 A | 9/1997 | Bhat | |
| 6,086,618 A * | 7/2000 | Al-Hilali et al. ................... | 703/2 |
| 6,397,066 B1 * | 5/2002 | Servi ............................. | 455/446 |
| 6,862,623 B1 | 3/2005 | Odhner et al. | |
| 6,898,564 B1 | 5/2005 | Odhner et al. | |
| 6,907,607 B1 * | 6/2005 | Mummert et al. ............ | 718/104 |
| 7,002,960 B1 | 2/2006 | Golan et al. | |
| 7,082,441 B1 | 7/2006 | Zahavi et al. | |
| 7,117,118 B2 | 10/2006 | Kalos et al. | |
| 7,171,668 B2 | 1/2007 | Molloy et al. | |
| 7,177,864 B2 * | 2/2007 | Ekhaus .......................... | 707/776 |
| 7,698,710 B1 * | 4/2010 | Mummert et al. ............. | 718/105 |
| 8,364,829 B2 * | 1/2013 | Mogul et al. ................ | 709/229 |
| 2002/0152305 A1 * | 10/2002 | Jackson et al. ................ | 709/224 |
| 2002/0156688 A1 * | 10/2002 | Horn et al. ....................... | 705/26 |
| 2002/0198749 A1 | 12/2002 | Tomlin et al. | |
| 2003/0046396 A1 * | 3/2003 | Richter et al. ................ | 709/226 |
| 2003/0212658 A1 * | 11/2003 | Ekhaus ............................ | 707/1 |
| 2003/0225563 A1 | 12/2003 | Gonos | |
| 2004/0010437 A1 * | 1/2004 | Kiran et al. ........................ | 705/8 |
| 2004/0039815 A1 * | 2/2004 | Evans et al. ................... | 709/225 |
| 2005/0005012 A1 | 1/2005 | Odhner et al. | |
| 2005/0080658 A1 * | 4/2005 | Kohn et al. ........................ | 705/8 |
| 2005/0097560 A1 * | 5/2005 | Rolia et al. .................... | 718/104 |
| 2005/0102121 A1 | 5/2005 | Odhner et al. | |
| 2005/0102318 A1 | 5/2005 | Odhner et al. | |
| 2005/0108380 A1 | 5/2005 | Odhner et al. | |
| 2005/0114274 A1 * | 5/2005 | Dube et al. .................... | 705/400 |
| 2005/0138170 A1 | 6/2005 | Cherkasova et al. | |
| 2005/0278439 A1 | 12/2005 | Cherkasova | |
| 2005/0278453 A1 | 12/2005 | Cherkasova | |

(Continued)

OTHER PUBLICATIONS

U.S. Appl. No. 11/742,525, filed Apr. 30, 2007, Rolia et al.

(Continued)

*Primary Examiner* — Sargon Nano

(57) ABSTRACT

A method comprises receiving, by pattern evaluation logic, a plurality of occurrences of a prospective pattern of resource demands in a representative workload. The method further comprises evaluating, by the pattern evaluation logic, the received occurrences of the prospective pattern of resource demands, and determining, by the pattern evaluation logic, based on the evaluation of the received occurrences of the prospective pattern of resource demands, how representative the prospective pattern is of resource demands of the representative workload.

21 Claims, 14 Drawing Sheets

(56) References Cited

U.S. PATENT DOCUMENTS

| | | | |
|---|---|---|---|
| 2006/0013134 A1 | 1/2006 | Neuse | |
| 2006/0069786 A1* | 3/2006 | Mogul et al. | 709/229 |
| 2006/0089982 A1 | 4/2006 | Abbott et al. | |
| 2006/0117317 A1* | 6/2006 | Crawford et al. | 718/104 |
| 2006/0150188 A1* | 7/2006 | Roman et al. | 718/104 |
| 2006/0154236 A1* | 7/2006 | Altschuler et al. | 435/4 |
| 2006/0235664 A1 | 10/2006 | Vinberg et al. | |
| 2007/0094379 A1* | 4/2007 | Stecher et al. | 709/224 |
| 2007/0118643 A1* | 5/2007 | Mishra et al. | 709/224 |
| 2007/0240161 A1* | 10/2007 | Prabhakar et al. | 718/104 |
| 2008/0172671 A1* | 7/2008 | Bouillet et al. | 718/104 |
| 2008/0172673 A1* | 7/2008 | Naik | 718/104 |
| 2008/0208536 A1* | 8/2008 | Bondi | 702/186 |
| 2008/0235703 A1* | 9/2008 | Crawford et al. | 718/104 |

OTHER PUBLICATIONS

U.S. Appl. No. 11/742,519, Rolia et al.
U.S. Appl. No. 11/742,530, Rolia et al.
U.S. Appl. No. 11/684,599, Cherkasova et al.
U.S. Appl. No. 11/935,196, Cherkasova et al.
U.S. Appl. No. 11/546,632.
U.S. Appl. No. 11/492,738.
"Capacity Planning for WebLogic Portal," URL: http://edocs.bea.com/wlp/docs81/capacityplanning/capacityplanning.html, May 21, 2007.
"The Workload for the SPECweb96 Benchmark," URL: http://www.spec.org/osg/web96/workload.html, Standard Performance Evaluation Corporation, May 21, 2007.
"TPC-W Benchmark," URL: http://www.tpc.org, Jun. 4, 2007.
Almeida, V., Bestavros, A., Crovella, M., de Oliveira, A., "Characterizing Reference Locality in the WWW," Technical Report, Boston University, TR-96-11, 1996.
Arlitt, M. and Williamson, C., "Web Server Workload Characterization: The Search for Invariants (Extended Version)," Department of Computer Science, University of Saskatchewan, 57 Campus Drive, Saskatoon, SK, Canada S7N 5A9, Mar. 15, 1996.
Arlitt, M. and Williamson, C., "Web Server Workload Characterization: The Search for Invariants," Department of Computer Science, University of Saskatchewan, SIGMETRICS '96 May 1996 PA, pp. 126-137.
Arlitt, M., Krishnamurthy, D., and Rolia, J., "Characterizing the Scalability of a Large Web-based Shopping System," ACM Transactions on Internet Technology, vol. 1, N 1, pp. 44-69, Aug. 2001.
Box, G.E.P., and G. Jenkins and G. Reinsel; "Time Series Analysis: Forecasting and Control;" Prentice Hall, Upper Saddle River, NJ, USA, 3rd Edition, 1994.
Chakravarti, I., Laha, R., and Roy, J, "Handbook of Methods of Applied Statistics," vol. I, John Wiley and Sons, pp. 392-394, 1967.
Chase, J.S., Anderson, D. Thakar, P. Vandat, A. and Doyle, R., "Managing Energy and Server Resources in Hosting Centers," Department of Computer Science, Duke University.
Cherkasova, L. and Tang, L., "Sizing the Streaming Media Cluster Solution for a Given Workload," In Proc. of the 4th IEEE/ACM CCGrid 2004, Chicago, USA, Apr. 2004.
Draper, N.R. and H. Smith, "*Applied Regression Analysis*;" John Wiley & Sons, New York, NY, USA, 3rd Ed., 1998.
Engle, R.F., "Autoregressive Conditional Heteroscedasticity with Estimates of the Variance of United Kingdom Inflation." Econometrica, 50(4): pp. 987-1008,1982.
Hartigan, J.A., Wong, M.A., "A K-Means Clustering Algorithm," *Applied Statistics*, vol. 28, pp. 100-108, 1979.
Jain, R., "The Art of Computer Systems Performance Analysis: Techniques for experimental Design, Measurement, Simulation, and Modeling," Wiley-Interscience, NY, 1991.
Kachigan, T.M., "A Multi-Dimensional Approach to Capacity Planning," In Proc. of CMG Conference 1980, Boston, MA, 1980.
Kelly, T. and Zhang, A., "Predicting Performance in Distributed Enterprise Applications," Hewlett-Packard Labs Tech Report, HPL-2006-76, May 2006.
Kelly, T., "Detecting Performance Anomalies in Global Applications," Second Workshop on Real, Large Distributed Systems, WORLDS '2005, San Francisco, Ca., Dec. 2005.
Klerk, L. and Bender, J., "Capacity Planning," URL: http://www.microsoft.com/technet/archive/itsolutions/ecommerce, Microsoft TechNet, 2000.
Menasce, D., Almeida, V., and Dowdy, L., "Capacity Planning and Performance Modeling: from Mainframes to Client-Server Systems," Prentice Hall, 1994.
Ranjan, S. and Rolia, J., Fu, H., and Knightly, E., "QoS-Driven Server Migration for Internet Data Centers," In Proc. of IWQoS 2002, Miami, FL, May 2002.
Rolia, J. and Vetland, V., "Correlating Resource Demand Information with ARM Data for Application Services," In Proc. of the ACM Workshop on Software and Performance, 1998.
Rolia, J., Cherkasova, L., Arlitt, M. and Andrzejak, A., "A Capacity Management Service for Resource Pools," In Proc. of the Fifth Intl. Workshop on Software and Performance, 2005.
Sarris, D. and Hofer, J., "Capacity Planning e-Commerce Systems With Benchmark Factory," URL: http://www.dlt.com/quest/.
Urgaonkar, B., and G. Pacifici, P. Shenoy, M. Spreitzer, and A. Tantawi: "An Analytical Model for Multi-tier Internet Services and its Applications," In Proc. of the ACM SIGMETRICS'2005, Banff, Canada, Jun. 2005.
Urgaonkar, B., Shenoy, P., Chandra, A., and Goyal, P., "Dynamic Provisioning of Multi-tier Internet Applications," In Proc. of the 2nd IEEE International Conference on Autonomic Computing (ICAC-05), Seattle, Jun. 2005.
Villela, D., Prashant, P., and Rubenstein, D., "Provisioning Servers in the Application Tier for E-Commerce Systems," In Proc. of IWQoS'04, Montreal, Canada, 2004.
Wimmer, M. and V. Nicolescu and D. Gmach and M. Mohr and A. Kemper and H. Kremar; "Evaluation of Adaptive Computing Concepts for Classical ERP Systems and Enterprise Services"; Proceedings of the IEEE Joint Conference on E-Commerce Technology and Enterprise Computing, E-Commerce and E-Services (CEC '06 and EEE '06); San Francisco, California, USA, Jun. 2006.

\* cited by examiner

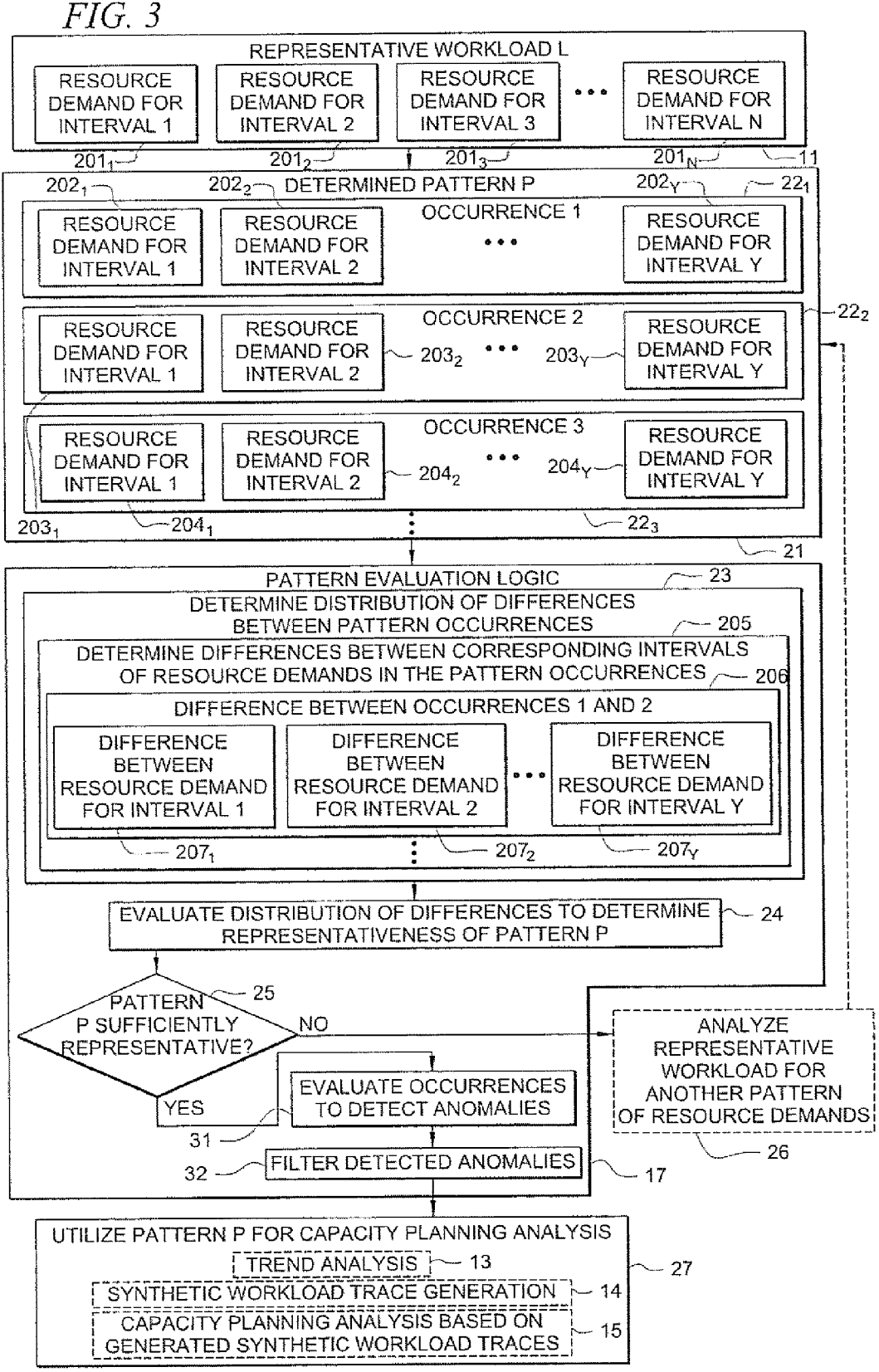

VARIABILITY OF DIFFERENCES IN DEMAND WITH RESPECT TO PATTERN

CHANGES TO THE WORKLOAD'S DEMANDS

SYSTEM AND METHOD FOR EVALUATING A PATTERN OF RESOURCE DEMANDS OF A WORKLOAD

TECHNICAL FIELD

The following description relates generally to evaluating determined patterns of resource demands of a workload to determine how representative such determined patterns are of the resource demands of the workload.

DESCRIPTION OF RELATED ART

Various computing environments exist in which computing workloads are supported/processed by the computing environment, and a desire generally exists for performing appropriate capacity planning for the computing environment to ensure that the environment has sufficient computing resources for adequately supporting an expected future workload. As a result of capacity planning, a determination may be made regarding whether and to what extent the computing environment's computing resources should be modified (e.g., increased), and/or a determination may be made regarding how many workloads to assign to a given resource of the computing environment. For instance, today computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services. To do so, it has become desirable for such service providers to perform appropriate capacity planning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Many computing environments contain resource pools that may be shared for supporting a number of different workloads. In general, resource pools are collections of computing resources, such as clusters of servers, racks of blades, or other computing resources that offer shared access to computing capacity. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output). Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. Thus, a consumer has a corresponding workload that demands capacity of the computing resource(s). Accordingly, a consumer generally consumes capacity for use in servicing the consumer's workload. Thus, the consumer has a resource "demand" for capacity from the resource pool for servicing its workload in a desired manner. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes e.g., CPU, memory, I/O operation rates, and bandwidths, each with limited capacity.

In the distant past, data centers were made up of small numbers of large mainframe computers that each hosted several application workloads with many users. Capacity planning experts helped to ensure that sufficient aggregate capacity was available just in time, as it was needed. With the advent of distributed computing, new application workloads were typically assigned to their own smaller servers. The incremental cost of capacity from smaller servers was much less expensive than the incremental cost of capacity on mainframes. Capacity planners would often anticipate an application's workload demands two years in advance and pre-provision a new server with sufficient capacity so that the workload could grow into it. However, the explosive growth in both enterprise computing and Internet computing has led to server sprawl in data centers. Enterprise data centers are typically full of large numbers of lightly utilized servers that incur high cost of ownership including facilities cost, such as rent and power for computing and cooling, high software licensing cost, and high cost for human management activities. Many enterprises are now beginning to exploit resource pools of servers supported by virtualization mechanisms that enable multiple application workloads to be hosted on each server. Different mechanisms have capabilities and characteristics that distinguish their purpose within data centers. Known virtual machine technologies, such as Xen, VMware, etc., enable configuration isolation, e.g., virtual machines may execute different operating systems and/or operating system versions while sharing the same physical host. Furthermore, some virtualization mechanisms (e.g., Xen, VMware) provide the ability to dynamically migrate virtual machines from one physical machine to another without interrupting application execution. Different products have different capabilities and different performance overheads.

The primary motivation for enterprises to adopt such technologies is increased flexibility, the ability to quickly repurpose server capacity to better meet the needs of application workload owners, and to reduce overall costs of ownership. Unfortunately, the complexity of these environments presents additional management challenges. There are many workloads, a finite number can be hosted by each server, and each workload has capacity requirements that may frequently change based on business needs. Capacity management methods are not yet available to manage such pools in a cost-effective manner. Accordingly, a desire exists for techniques for accurately and cost-effectively performing capacity planning analysis. In performing capacity planning analysis, a representative sampling of resource demands of a workload (e.g., historical resource demands of the workload observed over a given period, such as over a 6-month period) may be evaluated in attempt to detect patterns of the resource demands. For instance, the amount of resource demands may vary according to a particular periodic pattern, such as an hourly, daily, weekly, monthly, or other pattern. The resource demands may substantially repeat such pattern based on typical operations of the workload over the period of a pattern (e.g., hourly, daily, weekly, etc.). For example, resource demands of a software application may vary according to a periodic pattern based on increased and decreased usage of the application by users (e.g., an increased resource demand may be observed during day hours, and may decrease over night, as more users may use the application during the day). A determined pattern of resource demands for a workload may then be used in performing various planning tasks, such as in performing capacity planning, analysis regarding whether a system's resources should be increased or otherwise modified for supporting a predicted future amount of resource demands of a workload, for example.

However, any such analysis, such as capacity planning analysis, is largely dependent on the resource demand pattern being accurately identified for a workload. In many cases, it is difficult to determine whether a pattern accurately represents the true resource demands of a given workload. Thus, a desire exists for systems and methods for evaluating a pattern of resource demands of a workload to determine whether such pattern is truly a pattern that accurately represents resource demands of the workload. For instance, a desire exists for systems and methods that can evaluate a pattern of resource demands that is believed to exist in a representative workload (e.g., historical sampling of resource demands of the workload) to determine a metric that indicates how well such pattern truly represents the resource demands of such representative workload. In other words, a desire exists for a metric that indicates how confident one may be in concluding that a pattern accurately reflects resource demands of a representative workload.

BRIEF DESCRIPTION OF THE DRAWINGS

FIG. 3 shows a block diagram illustrating an exemplary technique for evaluating representativeness of pattern "P";

DETAILED DESCRIPTION

Figure 1:
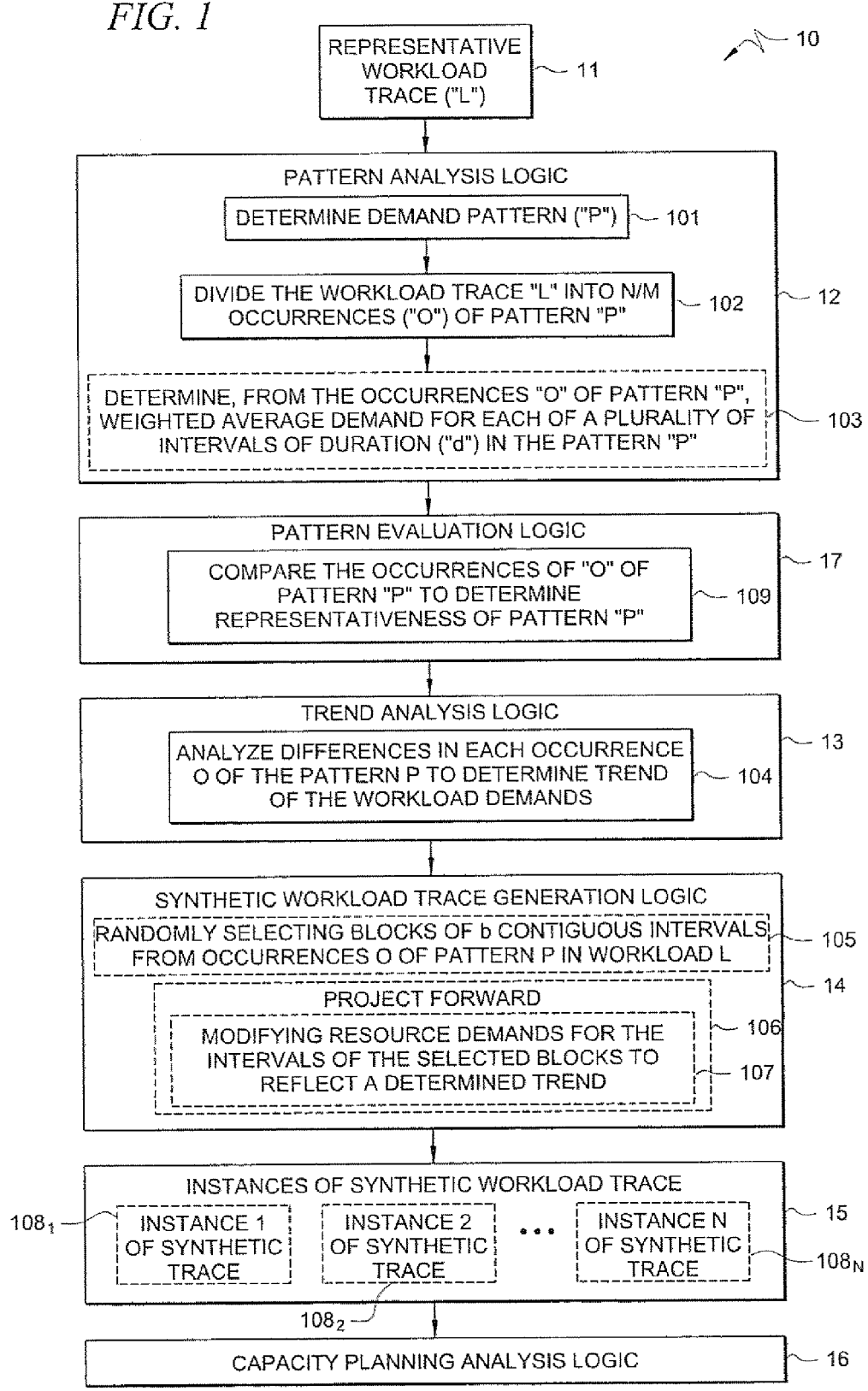
FIG. 1 shows an exemplary system according to an embodiment of the present invention.

Various embodiments of the present invention are now described with reference to the above figures, wherein like reference numerals represent like parts throughout the several views. As described further below, the present invention provides systems and methods for evaluating a pattern of resource demands of a workload to determine whether such pattern is truly a pattern that accurately represents resource demands of the workload. According to certain embodiments, a technique is provided for evaluating a pattern of resource demands that is believed to exist in a representative workload (e.g., historical sampling of resource demands of the workload) to determine a metric that indicates how well such pattern truly represents the resource demands of such representative workload. In other words, such a metric indicates how confident one may be in concluding that the pattern accurately reflects the occurrence of resource demands for the representative workload.

According to certain embodiments a representative workload that reflects resource demands of a workload (e.g., a given software application, process, etc., that is supported by a given system) over a period of time, such as over a 6-month period of time, is evaluated to determine resource demand patterns, if any, that are present within the workload. Such representative workload may, in some instances, be an actual historical workload of resource demands observed for a computing system. The patterns observed may be cyclic, repeating patterns of resource demands, such as hourly, daily, weekly, monthly, etc. Embodiments of the present invention provide systems and methods for evaluating how well all identified pattern of resource demands accurately reflects the resource demands of the representative workload. Thus, according to certain embodiments, an identified pattern of resource demands may be evaluated to determine whether such identified pattern is truly a pattern that is reflected in the resource demands of the representative workload.

In certain embodiments, once the evaluation determines that the pattern is sufficiently representative of the resource demands of the workload, the determined resource demand pattern may then be used in performing further capacity planning analysis. For instance, occurrences of the pattern identified in the representative workload may be analyzed to detect a trend of the resource demands (e.g., whether increasing, decreasing, etc.), and such a trend may be taken into account in generating synthetic workload traces that represent expected future resource demands of the workload, which can be analyzed to determine a system's capacity for supporting such expected future workload demands.

According to certain embodiments of the present invention, novel techniques for assessing the representativeness of a resource demand pattern (i.e., how well a demand pattern represents the resource demands of a workload) are provided. Further, according to certain embodiments of the present invention, novel techniques for determining trends of a workload's resource demands with respect to a demand pattern are provided. According to certain embodiments, representativeness of a resource demand pattern is evaluated to assess the quality of the pattern for a given workload, and such evaluation may also be used to recognize changes in resource demand patterns. In certain embodiments, a trending method computes trends at timescales greater than the duration of a resource demand pattern to ensure that periodic changes within the pattern do not unduly influence reported trend. Furthermore, in certain embodiments, the trending technique computes trends using occurrences of a pattern that are determined to be representative of the workload's resource demands.

FIG. 1 shows an exemplary system 10 according to an embodiment of the present invention. As shown in this example, a representative workload 11, which may be referred to as workload trace "L", of a computing system that is under analysis is received by pattern analysis logic 12. Representative workload trace 11 represents resource demands of a given workload (e.g., a given application, etc.) over some period of time, such as over a 3-month or 6-month period. The representative workload 11 may, in some embodiments, be data representing an actual historical workload encountered by the system under analysis. Thus, embodiments of the present invention may be employed to analyze an actual ("live") workload encountered by a deployed system, which may enable more accurate analysis and planning for the system. That is, representative workload 11 may comprise data representing resource demands of an actual historical workload collected for a computing system over a given period of time, say a preceding 6-month period, for example.

Actual historical workload data (e.g., for forming representative workload trace 11) may be collected through well-known application logs and system usage metrics, such as CPU utilization measured at defined time intervals (e.g., 5 minutes or so). As one example, the data collected in access logs generated by Hewlett-Packard's Open View Operations Center application server may be used in forming representative workload trace 11 according to certain embodiments. Other types of access logs (e.g., utilization capacity attributes, such as CPU, memory, network, and disk I/O), which may be customized for their respective applications, may be used for collecting a live workload in accordance with embodiments of the present invention.

The representative workload trace 11 may include data that reflects an amount of resource demands of the workload over a period of time, such as over a 6-month period. In certain embodiments, the representative workload trace 11 may comprise a plurality of intervals within the period of monitored time, such as 5-minute intervals within the 6-month monitored period, and data may be provided reflecting the corresponding amount of resource demands made by the workload during each interval. Such resource demands may comprise a demand for utilization of any resource of the computing system, such as an amount of utilization of CPU, memory, I/O resources, network bandwidth resources, etc. of the computing system for performing the desired tasks of the workload. In certain embodiments of the present invention, the resource demands that are of interest are processing demands (e.g., CPU demands), and thus the resource demand data in the representative workload trace 11 may reflect the corresponding processing demands (e.g., CPU utilization) for each of the plurality of intervals in the monitoring period of time. Of course, in other embodiments, the resource demands may additionally or alternatively reflect demands by the workload for other computing resources, such as memory utilization, I/O access, network bandwidth access, etc.

Thus, representative workload trace 11 may comprise the above-mentioned data, which is stored to a computer-readable medium, such as memory, hard drive, peripheral data storage drive, optical data storage (e.g., CD, DVD, etc.), magnetic data storage, tape storage, etc. Representative workload trace 11 may be stored in the form of any suitable data structure, such as to a database, file, table, etc. Again, in certain embodiments, such data may represent resource demands of an actual historical workload encountered by a computing system under analysis.

Pattern analysis logic 12 receives the representative workload trace 11 with N contiguous measurement intervals of equal duration, and analyzes such representative workload trace 11 to determine, in operational block 101, a pattern "P," if any, of resource demands that exists within the representative workload trace 11. The determined resource demand pattern "P" may be a cyclic, repeating pattern of the resource demands that occurs within the representative workload trace 11, such as an hourly, daily, weekly, monthly, etc., cyclic pattern. For instance, the pattern "P" may be a pattern having a duration that corresponds to M measurement intervals, wherein M is less than N (e.g., each cycle of the pattern has a duration of M measurement intervals).

According to certain embodiments of the present invention, pattern analysis logic 12 further uses the determined resource demand pattern "P" to, in operational block 102, identify a number of occurrences of the pattern "P" within the representative workload trace 11. That is, pattern analysis logic 12 may divide the representative workload trace 11 into a number of N/M occurrences ("O") of the determined pattern "P," as discussed further herein below.

Further, according to certain embodiments of the present invention, pattern analysis logic 12 may determine, in operational block 103, from the determined occurrences "O" of pattern "P," a weighted average resource demand for each of a plurality of intervals of duration within the pattern "P". For instance, pattern "P" may be a daily pattern (i.e., a cyclic pattern that repeats daily), and within each occurrence of the daily pattern in the representative workload trace 11, there may exist a number of intervals (e.g., 5-minute intervals) for which resource demand data is available. For example, there exist 288 5-minute intervals within a 24-hour period, and thus for each occurrence of a daily pattern "P" in the representative workload trace 11, there may be 288 5-minute intervals with corresponding resource demand data for each interval. The weighted average provides a model for the pattern that can be used to illustrate expected pattern behavior to an operator and to support forecasting exercises where an operator may desire to perturb the pattern for the purpose of sensitivity analysis, for example. Having a single pattern (i.e., the weighted average) to work with makes it easier to specify changes.

According to embodiments of the present invention, pattern evaluation logic is provided, which is operable to evaluate the determined pattern "P" in the representative workload trace 11. In this embodiment, pattern evaluation logic 17 is operable to analyze occurrences of the pattern P in the representative workload trace 11 to determine a level of confidence that the determined "P" is actually a true pattern of resource demands. As discussed above, traditionally an appropriate metric for evaluating a pattern of workload resource demands to determine a level of confidence that such pattern accurately represents the resource demands of the workload has not existed.

As shown in FIG. 1, in certain embodiments, pattern evaluation logic 17 compares, in operational block 109, the occurrences "O" of pattern "P" identified in the representative workload trace 11 to determine the representativeness of pattern "P". For instance, as discussed further herein, based on a distribution of differences between the identified occurrences of the pattern P, pattern evaluation logic 17 can determine a metric that measures confidence that the pattern "P" actually exists for the resource demands present in representative workload trace 11.

Additionally, in certain embodiments, further capacity planning analysis may be performed based on the representativeness of the pattern P. For instance, further capacity planning analysis may be performed based on the determined pattern P once pattern evaluation logic 17 indicates a sufficiently high level of confidence that the pattern P accurately represents the resource demands of the representative workload trace 11. Further, in certain embodiments, the pattern evaluation logic 17 may evaluate occurrences of the determined pattern to detect anomalies in the representative workload trace 11, and, if so desired, such anomalies may be filtered from use in further capacity planning analysis. For example, suppose a pattern P is a weekly pattern and representative workload 11 comprises 52 weeks of resource demands, of which 51 weeks are determined to correspond to the pattern (e.g., there exists a similar distribution of differences between the 51 occurrences of the pattern P), and 1 of the 52 weeks does not correspond well, which may correlate with a holiday or some other anomaly in the resource demands. Thus, the 1 week that does not correspond well may, in some implementations, be filtered from the further capacity planning analysis, such as the trend analysis, synthetic workload trace generation, and capacity planning analysis described further below.

In certain embodiments system 10 further comprises trend analysis logic 13, which is operable to analyze the determined pattern "P" (e.g., which has been determined by pattern evaluation logic 17 as having a sufficiently high level of confidence) to determine a trend in the workload, wherein such trend may be used for projecting (e.g., estimating) the future resource demands of the workload. For instance, the representative workload trace 11 for the preceding 6 months may be analyzed to determined occurrences of a pattern "P" of resource demands, and trend analysis logic 13 may further analyze the occurrences of pattern "P" within the representative workload trace 11 to determine a trend that may be used for projecting (e.g., estimating) the resource demands of the workload trace that are expected for the upcoming 6 months (or other future period of time). For example, as shown in the operational block 104, according to certain embodiments of the present invention, trend analysis logic 13 analyzes differences in each occurrence "O" of the pattern "P" in the representative workload 11 to determine a trend of the workload resource demands.

Once a determined pattern is evaluated and determined to be sufficiently representative of the resource demands of a workload, such pattern may be used in various ways, such as in determining a trend of the workload resource demands (as mentioned above) and/or for generating synthetic workload traces that may be used for evaluating capacity needs of a system of supporting future expected demands of the workload. Exemplary techniques that may be employed for generating such synthetic workload traces are described further in co-pending and commonly assigned U.S. patent application Ser. No. 11/742,525, titled "SYSTEM AND METHOD FOR GENERATING SYNTHETIC WORKLOAD TRACES", to Jerome Rolia et al., filed on Apr. 30, 2007, the disclosure of which is hereby incorporated herein by reference in its entirety. According to certain examples, system 10 comprises synthetic workload trace generation logic 14 that is operable to generate one or more synthetic workload traces 15 that are representative of an expected future resource demands of the workload under analysis (i.e., the workload for which representative workload trace 11 was captured). As discussed further herein, it is generally desirable for the generated synthetic workload trace to possess characteristics consistent with those of the workload that the trace is intended to represent. Thus, for accurate capacity planning analysis, not only are such characteristics as total resource demands and peak resource demands that occur within an occurrence of a pattern P desired to be properly reflected, but other characteristics of the underlying trace, such as the internal resource demands within the pattern P should be accurately represented in the synthetic workload trace. For instance, a pattern in which resource demands are high for a plurality of contiguous intervals and are then low for a plurality of contiguous intervals may not be accurately represented (e.g., for capacity planning purposes) by a synthetic workload trace which evenly distributes the resource demands across the pattern, even though the total resource demands and peak resource demands may be accurately represented by the synthetic workload trace. Thus, it is desirable to accurately represent, in a synthetic workload trace, the internal characteristics of a given pattern, such as the resource demands that are persistent over a plurality of contiguous intervals within the pattern. Accordingly, as discussed further herein, in certain embodiments, synthetic workload trace generation logic 14 randomly selects, in operational block 105, blocks of "b" contiguous intervals from occurrences "O" of pattern "P" in the representative workload trace 11. While this is described as a "random" selection of blocks, in certain embodiments, the random selection may be based on weights from the weighted average determined in block 103. Thus, the randomness of the selection may, in certain embodiments, be influenced by certain factors, such as the weighted average determined in block 103.

Synthetic workload trace generation logic 14 then projects the pattern of resource demands forward, in operational block 106, in order to determine a synthetic workload trace that is representative of future-expected resource demands of the workload under analysis. In doing so, synthetic workload trace generation logic 14 may, in operational block 107, modify resource demands for the intervals of the selected blocks to reflect a trend (as determined by trend analysis logic 13) in generating the resource demands of the synthetic workload trace(s) 15.

In certain embodiments, synthetic workload trace generation logic 14 repeats to generate a plurality of instances of synthetic workload traces, such as instances $108_1$, $108_2$, . . . $108_N$ shown in FIG. 1. As described further herein, such plurality of instances may enable analysis of a range of possible resource demands that may be encountered in the future for the workload under analysis, thus allowing the risks associated with such possible resource demand traces to be considered. Exemplary techniques that may be employed by synthetic workload trace generation logic 14 for generating the synthetic workload trace(s) 15 are described further in co-pending and commonly assigned U.S. patent application Ser. No. 11/742,525, titled "SYSTEM AND METHOD FOR GENERATING SYNTHETIC WORKLOAD TRACES", the disclosure of which was incorporated above by reference.

As with the representative workload trace 11, the generated synthetic workload trace(s) 15 (e.g., each instance $108_1$-$108_N$ of such synthetic workload trace) may thus comprise data reflecting corresponding amount of resource demands expected (e.g., in each of a plurality of intervals) for the workload over a future period of time, which is stored to a computer-readable medium, such as memory, hard drive, peripheral data storage drive, optical data storage (e.g., CD, DVD, etc.), magnetic data storage, tape storage, etc. Generated synthetic workload trace(s) 15 may be stored in the form of any suitable data structure, such as to a database, file, table, etc.

According to certain embodiments, system 10 further comprises capacity planning analysis logic 16 that receives the generated synthetic workload trace(s) 15 for one or more workloads under analysis and analyzes the capacity of the resources of a computing system for supporting such synthetic workload traces. In this manner, the capacity of a given computing system for supporting expected future resource demands of a given workload that is under analysis can be evaluated. Further, a plurality of workloads can be evaluated to determine which workloads may best share a given resource, etc. For instance, by evaluating generated synthetic workload traces for a plurality of different workloads, capacity planning analysis logic can determine how the resource demands of the different workload traces interact, such as whether the resource demand peaks of the different workload traces occur simultaneously. As a result, the aggregate resource demands for serving the different workloads can be evaluated for determining an optimal assignment of the different resources to various shared resources (e.g., determining which resources are best for sharing a given resource, etc.)

Various elements of exemplary system 10, such as pattern analysis logic 12, trend analysis logic 13, synthetic workload trace generation logic 14, capacity planning analysis logic 16, and/or pattern evaluation logic 17 may be implemented as computer-executable software code stored to a computer-readable medium and/or as hardware logic, as examples.

Figure 2:
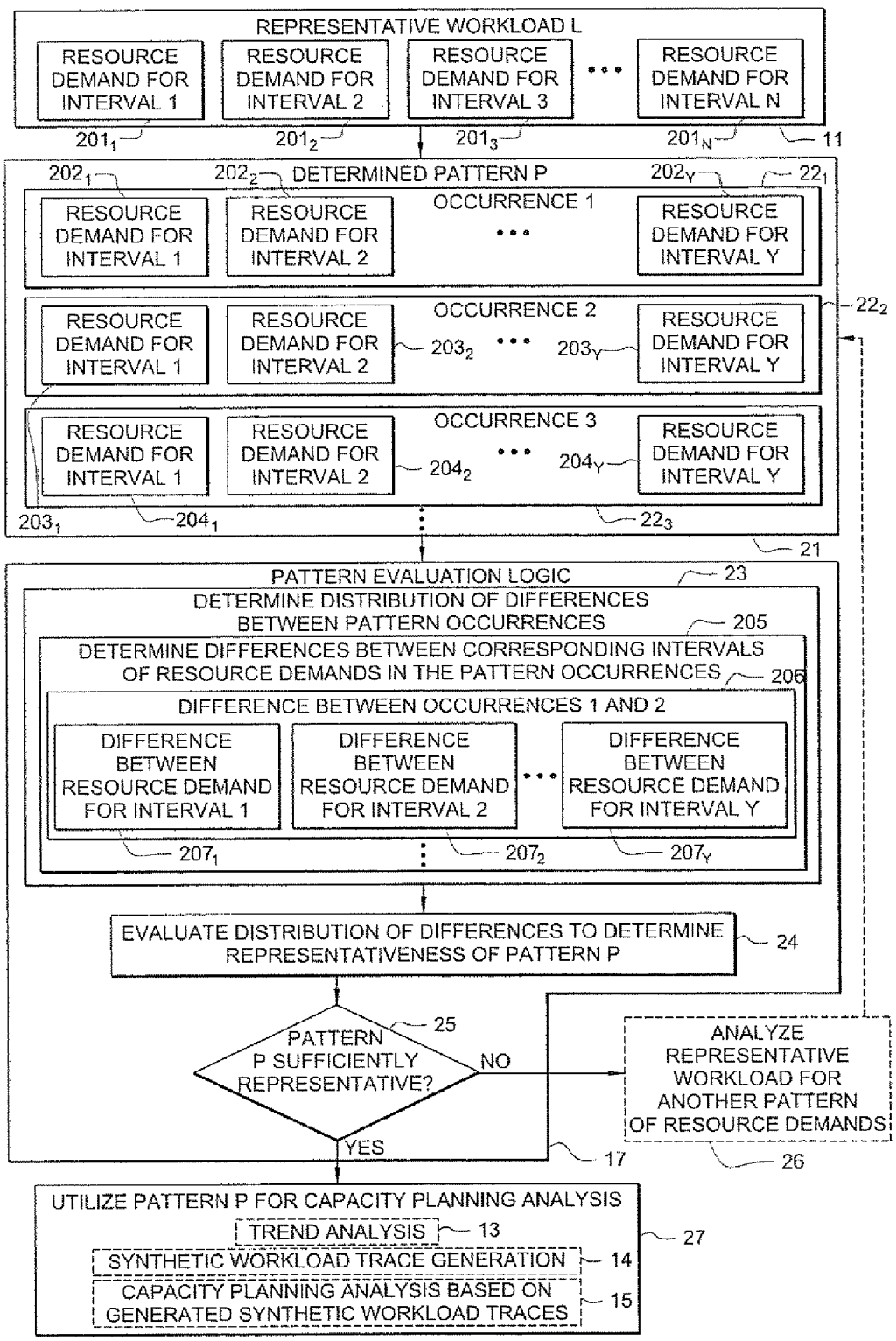
FIG. 2 shows a block diagram illustrating an exemplary technique for analyzing occurrences of a determined resource demand pattern for evaluating representativeness of the pattern, according to one embodiment of the present invention.

FIG. 2 shows a block diagram illustrating an exemplary technique for evaluating occurrences of a determined resource demand pattern for evaluating the representativeness of such pattern, according to one embodiment of the present invention. As shown in FIG. 2, representative workload trace 11 includes a plurality of measurement intervals $201_1$, $201_2$, $201_3$, . . . , $201_N$, each with a corresponding amount of resource demand (e.g., CPU utilization) of the workload. As mentioned above, a resource demand pattern "P" 21 may be determined from the representative workload trace 11, and as shown in FIG. 2 a plurality of occurrences $22_1$, $22_2$, $22_3$, . . . , etc., of such pattern "P" may be identified in the representative workload trace 11. Each occurrence of the pattern "P" may include a plurality of resource demand measurement intervals. For instance, if the pattern "P" is a daily pattern and the measurement intervals $201_1$-$201_N$ are each 5-minute intervals, then there exists 288 of such measurement intervals in each occurrence of the daily "P" pattern. In the example of FIG. 2, each occurrence of the pattern P includes Y resource demand measurement intervals, wherein Y is any number greater than 1. So, occurrence $22_1$ of pattern "P" includes resource demand measurement intervals $202_1$, $202_2$, . . . , $202_Y$ (e.g., the Y resource demand intervals of the first occurrence of the pattern P identified in representative workload 11); occurrence $22_2$ of pattern "P" includes resource demand measurement intervals $203_1$, $203_2$, . . . $203_Y$; and occurrence $22_3$ of pattern "P" includes resource demand measurement intervals $204_1$, $204_2$, . . . , $204_Y$.

Pattern evaluation logic 17 may receive such occurrences $22_1$-$22_3$ of the pattern "P" that is under analysis, and determine, in operational block 23, a distribution of differences between the pattern occurrences $22_1$-$22_3$. Accordingly, in this exemplary embodiment, occurrences of the pattern "P" that are identified in the representative workload 11 are compared against one another to compute a metric indicating how fairly the pattern "P" is represented in the workload occurrences. In this example, pattern evaluation logic 17 determines, in operational block 205, differences between corresponding intervals of resource demands in the pattern occurrences. For instance, differences between interval 1 (e.g., intervals $202_1$-$204_1$) present in the occurrences $22_1$-$22_3$ may be evaluated; differences between interval 2 (e.g., intervals $202_2$-$204_2$) present in the occurrences $22_1$-$22_3$ may likewise be evaluated; and so on. Thus, for example, difference between the occurrences $22_1$ and $22_2$ may be determined, as illustrated by block 206, wherein the difference between resource demands for interval 1 $207_1$, interval 2 $207_2$, . . . , and interval Y $207_Y$ of the occurrences $22_1$ and $22_2$ may be determined. In this way, the internal consistency within the plurality of measurement intervals contained within each occurrence of the pattern "P" may be evaluated, rather than merely evaluating the similarity of the peak resource demands and total resource demands for each occurrence. According to certain embodiments of the present invention, while the differences between occurrences of a pattern under evaluation are determined on an interval-by-interval basis (e.g., by comparing corresponding resource demand measurement intervals contained within each pattern occurrence), the distribution of the determined differences is evaluated in determining the representativeness of the pattern, as discussed further herein.

As discussed further below, according to certain embodiments, the distribution of differences between pattern occurrences, in operational block 23, may be performed by analyzing cumulative distribution function (CDF) of different occurrences. For instance, in certain embodiments, a Kolmogorov-Smirnov test (KS-test) is employed to compare the CDFs of differences for pairs of occurrences of a pattern "P" that is under evaluation, as discussed further below. In another embodiment, a test that is based on the Chi-squared test is employed to compare the CDFs of differences for pairs of occurrences of a pattern "P" that is under evaluation, as also discussed further below.

In the exemplary embodiment illustrated in FIG. 2, pattern evaluation logic 17 may, in operational block 24, evaluate the determined distribution of differences among the occurrences of the pattern "P" that is under evaluation to determine the representativeness (or a "confidence level") of pattern P. For instance, the higher the number of pairs of occurrences of the pattern "P" that have a similar distribution of differences, then the more confident evaluation logic 17 may be that pattern P is representative of the resource demands of a workload. In operational block 25, pattern evaluation logic 17 may determine whether the pattern "P" that is under evaluation is determined to be sufficiently representative of the resource demands of the workload (e.g., whether the confidence level of the pattern P is sufficiently high). Such a determination may be made by comparing the determined representativeness (or confidence level) metric that was computed for the occurrences of the pattern P against a pre-set threshold (or "critical value"), wherein the pattern P is determined to be sufficiently representative only if the computed metric is at least the pre-set threshold. If not, then operation may advance to block 26 whereat the representative workload 11 may be further analyzed (e.g., by pattern analysis logic 12 of FIG. 1) to detect another pattern of resource demands, wherein any such other pattern may then be evaluated in a similar manner as described for pattern "P". If determined in block 25 that pattern P is sufficiently representative of the workload resource demands, then the pattern P may be utilized in operational block 27 to perform further capacity planning analysis, such as trend analysis 13, generation of synthetic workload traces 14, and analyzing the generated synthetic workload traces for capacity planning 16.

Turning to FIG. 3, a block diagram illustrating an exemplary technique for evaluating representativeness of pattern "P" according to one embodiment of the present invention is shown. In this example, like elements as those shown in the exemplary block diagram of FIG. 2 are again shown, with the addition of operational blocks 31 and 32 within pattern evaluation logic 17, which are discussed further below. According to certain embodiments, anomalies (e.g., occurrences of pattern P that are not sufficiently similar to the pattern), may be detected, and such non-representative occurrences may be filtered from use in further capacity planning analysis, such as in trend analysis 13 and in generating synthetic workload traces 14.

Thus, according to the exemplary embodiment of FIG. 3, pattern evaluation logic 17 determines in operational block 25 whether the pattern P that is under analysis is sufficiently representative of the resource demands. As discussed further herein, such determination may be made, for example, based on whether a sufficient number of the occurrences $22_1$-$22_3$ have similar distributions of differences (e.g., the below-described KS-test or chi-squared test for comparing the CDFs of the occurrences indicate that a sufficient number of the occurrences have distributions of differences that satisfy a pre-defined critical threshold value). For example, suppose pattern P is a weekly pattern and representative workload 11 comprises 52 weeks of resource demands, of which 51 weeks (i.e., 51 of the occurrences of the pattern P) are determined to have sufficiently similar distributions of differences, while 1 of the 52 weeks does not correspond well, which may correlate with a holiday or some other anomaly in the resource demands. If determined in operational block 25 that having 51 of the 52 occurrences of the pattern P with sufficiently similar distributions of differences is sufficient to conclude that pattern P is representative of the resource demands, then operation may continue to block 31 whereat the occurrences may be evaluated to detect anomalies. In this example, the 1 week that does not correspond well may be determined to be an anomaly in the representative workload. Then, in operational block 32, such detected anomalies may be filtered from further capacity planning analysis 27. Thus, in this example, the 1 week that does not correspond well may be filtered from the further capacity planning analysis, such as the trend analysis 13, synthetic workload trace generation 14, and capacity planning analysis 16.

As mentioned above, it may be desirable to predict future resource demands of a given workload. A workload demand prediction service may serve one or more of at least three purposes: i) to recognize whether a workload's demands change significantly over time; ii) to support the generation of synthetic demand traces that represent future demands for each workload (e.g., demands for several weeks or months into the future) to support capacity planning exercises; and, iii) to provide a convenient model that can be used to support forecasting exercises. Exemplary techniques that may be employed according to embodiments of the present invention for implementing a workload demand prediction service are described further below.

Any suitable technique may be employed by pattern analysis logic 12 for evaluating a representative workload 11 and recognizing a pattern "P" of resource demands within such representative workload 11. According to one embodiment, pattern analysis logic 12 employs a three-stage approach to recognize a likely pattern "P" within representative workload 11, see e.g., M. Wimmer and V. Nicolescu and D. Gmach and M. Mohr and A. Kemper and H. Kremar, "Evaluation of Adaptive Computing Concepts for Classical ERP Systems and Enterprise Services," *Proceedings of the IEEE Joint Conference on E-Commerce Technology and Enterprise Computing, E-Commerce and E-Services (CEC '06 and EEE '06)*, San Francisco, Calif., USA, June 2006, the disclosure of which is hereby incorporated herein by reference. In the first phase, many hypothetical patterns are found. In the second phase, trends are computed using techniques described further herein. Finally, in the third phase, the hypothetical patterns are evaluated by pattern evaluation logic 17 and a recommendation is made regarding the most likely pattern for the workload. The recommendation may be that the workload is periodic with a certain cycle time or a-periodic such that no clear cycle time was found. In both cases the trend is also reported.

One exemplary implementation of pattern analysis logic 12 that may be employed is now briefly described. Given a historic workload trace $L=(l(t_n))_{1 \le n \le N}$ which is represented by N contiguous demand values $l(t_n)$, pattern analysis logic 12 may extract a demand pattern $P=(p(t_m))_{1 \le m \le M, M \le N/2}$ with M contiguous demand values $p(t_m)$ with the assumption that the workload has a cyclic behavior. This assumption is evaluated in a later classification phase. According to a classical additive component model, a time series includes a trend component, a cyclical component, and a remainder, e.g., characterizing the influence of noise. According to this exemplary implementation, the trend is a monotonic function, modeling an overall upward or downward change in demand.

Figure 4A:
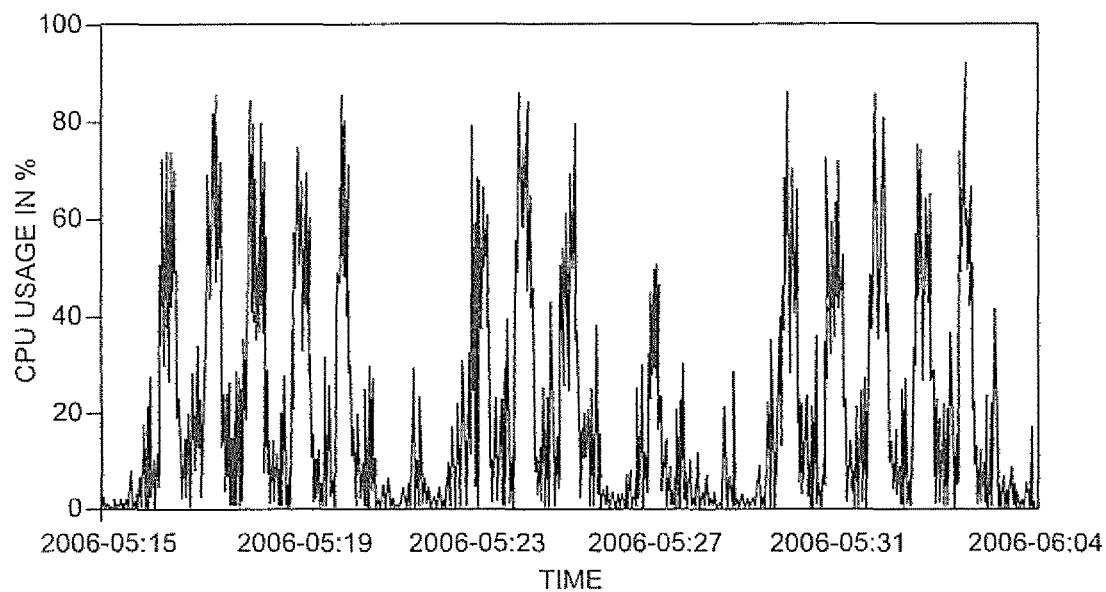
FIG. 4A shows a graph for an exemplary three-week historical workload demand trace.

The process for extracting a representative demand pattern from a historical workload that is employed by this exemplary implementation of pattern analysis logic 12 is illustrated with FIGS. 4A-4D. FIG. 4A illustrates a graph for a three-week historical workload demand trace. Note that in this example there was a public holiday during the second week of the trace.

Figure 4B:
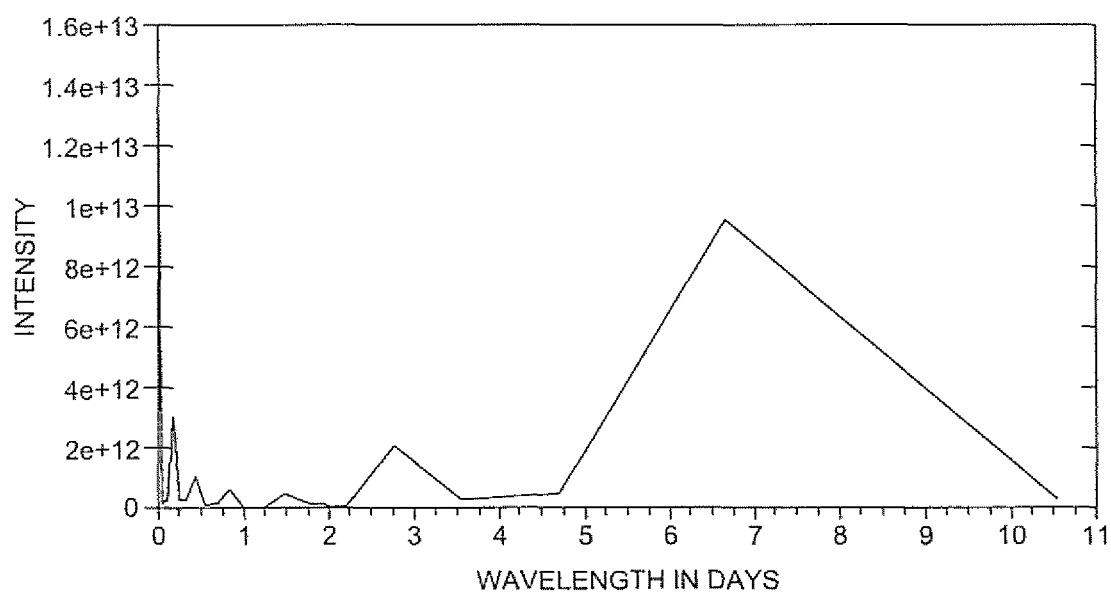
FIG. 4B shows a graph illustrating a periodogram of the exemplary three-week historical workload demand trace of FIG. 4A.

To start the analysis of this exemplary embodiment, pattern analysis logic 12 identifies the cyclical component that describes the periodic characteristics of the workload. To determine the yet unknown duration, M, of the pattern, pattern analysis logic 12 begins with an evaluation of the workload's periodogram function, as shown in the graph of FIG. 4B. A Fourier transformation dives an overlay of harmonics for the time-varying magnitude of demand. The periodogram shows the intensity, I, with which a harmonic of a wavelength $\lambda$ is present in the workload. The most dominant frequencies provide information about the duration of a potential pattern. Intuitively, if the periodogram function has a local maximum at $\lambda>0$, then it is likely that there exists a representative pattern of length $\lambda$. In general, it is not the case that the wavelength with the global maximum, named $max_1$, is most representative. Thus, according to this exemplary embodiment, pattern analysis logic 12 determines a set $\Lambda=\{\lambda_1, \ldots, \lambda_k\}$ of local maxima positions, with $$I(\lambda_i) > \frac{max_i}{2}$$

for every $1 \leq i \leq k$. For instance, in the periodogram in FIG. 4B, detect two local maxima are detected. The first maximum proposes a wavelength of 1 day and the second maximum proposes one at 7 days.

Figure 4C:
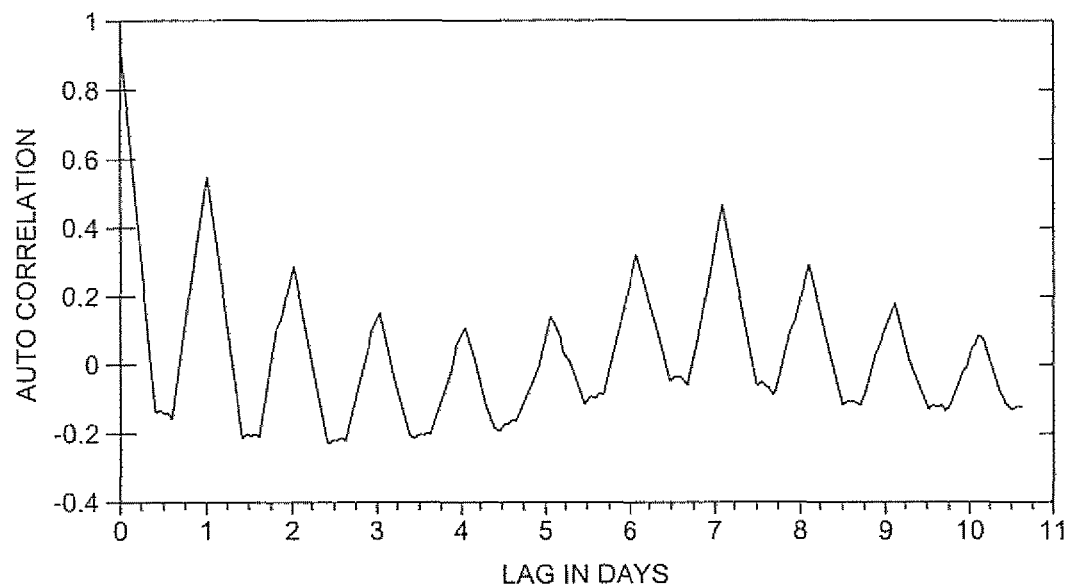
FIG. 4C shows a graph illustrating auto-correlation of the exemplary historical workload demand trace of FIG. 4A.

In addition to the periodogram, pattern analysis logic 12, according to this exemplary embodiment, calculates the auto-correlation function for the workload demand trace. For a formal definition and further details on auto-correlation function, see G. E. P. Box, G. Jenkins and G. Reinsel. *Time Series Analysis: Forecasting and Control.* Prentice Hall, Upper Saddle River, N.J., USA, third edition, 1994. FIG. 4C shows a graph illustrating the auto-correlation function for the workload. It describes dependencies within the workload curve, i.e., the similarity between the workload and the workload shifted by a lag g. A high value $\rho$ for the auto-correlation at lag g denotes that the $\rho$ workload curve shifted by g looks similar to the original one. Thus, if the auto-correlation shows local extrema at multiples of a lag g, it is a strong indicator that there exists a temporal dependency of length g. In the same way as with the periodogram, pattern analysis logic 12, according to this exemplary embodiment, determines a set of hypotheses $\{\lambda_{i+l}, \ldots, \lambda_{k+h}\}$ of significant local extreme positions and add them to the set $\Lambda$.

Workloads from enterprise data centers typically show a periodicity which is a multiple of hours, days, weeks, and so forth. Due to unavoidable computational inaccuracies and influences of irregular events and noise, the wavelengths in $\Lambda$ can diverge slightly from these typical periods. Thus, according to certain embodiments, a comparison to calendar-specific periods is performed to determine for every wavelength candidate $\lambda_i$ the best matching multiple of hours, days, and weeks and augment $\Lambda$ with corrected wavelengths so that they are also considered.

In the second phase of this exemplary embodiment, pattern analysis logic 12 selects the best candidate wavelength $\Lambda'$ from the $\lambda_i \in \Lambda$. For each $\lambda_i$, pattern analysis logic 12 computes the average magnitude for $\rho$ at multiples of $\lambda_i$. For example, if $\lambda_i=1$ day, then pattern analysis logic 12 takes the average of $\rho_i$ from observations at lags of one day. If $\lambda_i=7$ days, then pattern analysis logic 12 takes the average of $\rho_i$ from observations at lags of seven days. If the workload exhibits a pattern with length $\lambda_i$, then the workload after shifting it by multiples of $\lambda_i$ is similar to itself and thus the auto-correlation function exhibits high values at the lags $\{v \cdot \lambda_i | v \in N^+\}$. The average magnitude $\overline{\rho}_i$ is a measure of similarity among cyclic repetitions in demand for $\lambda_i$. For the example in FIG. 4C, $\lambda_i=7$ days has the highest average magnitude $\overline{\rho}'$ as compared to other values for $\lambda_i$ and is thus recognized as the best pattern length. This implies that the pattern length is M=2016 intervals of duration d=5 minutes (note that there are 288 5-minutes intervals per day). It should be noted that FIG. 4C does not illustrate lags beyond 11 days, even though they are included in the computation.

The chosen value for the pattern length of M intervals is used to calculate the pattern $P=(p(t_m))_{1 \leq m \leq M}$ for the workload. First, according to this exemplary embodiment of pattern analysis logic 12, the pattern analysis logic 12 defines occurrences for the pattern and then defines the pattern's demand values $(p(t_m))$. Given M, the workload L is divided into N/M complete occurrences and possibly one partial occurrence, as in operational block 102 of FIG. 1. Let O be the occurrences of the pattern for $o \leq N/M+1$. Thus, occurrence o is a subtrace of the trace L with values $l^o(t_m)=l(t_{m+o \cdot M})$ for each $1 \leq m \leq M$. For every interval $t_m$ in the pattern, pattern analysis logic 12 calculates a weighted average $\rho(t_m)$ for the interval, as in operational block 103 of FIG. 1. In this exemplary embodiment, the weighted average is computed using intervals $t_m$ from the occurrences O of the pattern. Thus, in this embodiment, we define a weight, $W_{o,m}$, for each occurrence o and interval m as:

$$w_{o,m} = \frac{l^o(t_m)}{\sum_o l^o(t_m)}.$$

With these weights, the weighted average demand for each interval $t_m$ is computed as $\rho(t_m)=\Sigma_o w_{o,M} l^o(t_m)$. The resulting weighted average may be used to emphasize the importance of larger values over smaller values for capacity management.

Figure 4D:
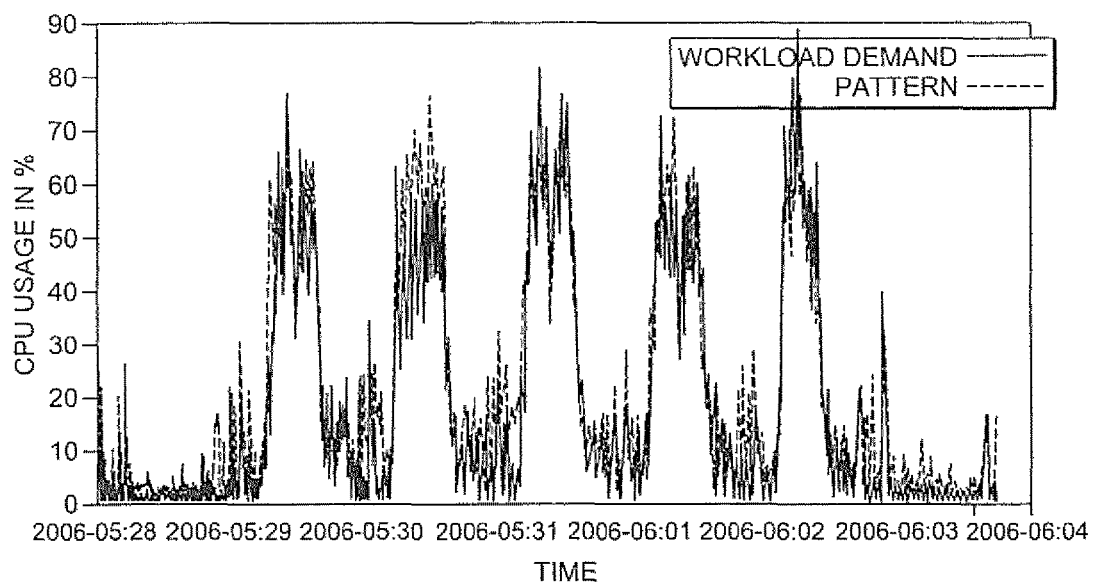
FIG. 4D shows a graph illustrating an extracted resource demand pattern determined for the exemplary historical workload demand trace of FIG. 4A.

FIG. 4D shows the pattern and an occurrence of the pattern together in one diagram. It should be noted that the curves closely resemble one another.

In the next phase of this exemplary embodiment, trend analysis logic 13 analyzes the trend of the historical workload trace 11. For this, trend analysis logic 13 calculates the overall deviation of each occurrence of the pattern from the original workload L. Let $c_m^o$ be the difference between the $\rho(t_m)$ and the demand value for interval $t_m$ in the occurrence o. We define $c^o$ as the aggregate demand difference of occurrence o with respect to the pattern P as: $c^o=\Sigma_{1 \leq m \leq M}(p(t_m)-l^o(t_m))$. Further, we define the trend $\tau$ as the gradient of the linear least squares fit through the values $c^o$ for the occurrences O as ordered by time (see e.g., N. R. Draper and H. Smith. *Applied Regression Analysis.* John Wiley & Sons, New York, N.Y., USA, third edition, 1998). The trend $\tau$ estimates the rate of change of demand over time with respect to the pattern.

The classification phase decides which workloads have periodic behavior. The classification is based on two measures for the quality of the pattern. The first measure is $\overline{p}'$ from above. Larger values for $\bar{p}'$ imply a better quality of fit. The second measure characterizes the difference between occurrences O and the pattern. The difference is computed as the average absolute error $$\varsigma = \frac{\sum_{1 \leq m \leq M \cdot o} |p(t_m) - l^{\circ}(t_m)|}{N}$$

between the original workload and the pattern P. Smaller differences suggest a better quality of pattern.

To classify the quality of patterns for a large number of workloads, certain embodiments employ a k means cluster algorithm (see e.g., J. A. Hartigan and M. A. Wong. A K-Means Clustering Algorithm. In *Applied Statistics*, vol. 28, pp. 100-108, 1979) with clustering attributes $\varsigma$ and $\bar{p}'$. The algorithm partitions the patterns into three groups that we interpret as having strong, medium, or weak patterns. Weak patterns are regarded as a-periodic because no clear cycle could be deduced for the trace. A trace of extended duration may provide insight into longer cycles.

However, such a clustering algorithm does not explain why a pattern is considered strong, medium, or weak. As discussed further herein, according to certain examples, a KS-test or chi-squared test may be employed to aid in recognizing which occurrences of a pattern under analysis are anomalous. Each of the KS-test and chi-square embodiments is described further below.

An exemplary embodiment of synthetic workload trace generation logic 14 is now described. In this embodiment, synthetic workload trace generation logic 14 employs a novel process for generating a synthetic trace to represent a future workload demand trace L' for some time period in the future. Typically, traces are generated to represent demands for a time period that is several weeks or months into the future. The general goal for a synthetic trace, according to this embodiment, is to capture the highs and lows of demand and contiguous sequences of demand. These are important characteristics for accurately modeling a workload's ability to share resource capacity with other workloads and to model required capacity for the workload. Furthermore, this exemplary embodiment supports the ability to introduce an observed trend or forecast information.

To generate an occurrence o' for L', this exemplary embodiment relies on the historical pattern occurrences O. A value $l^{\circ'}(t_m)$ is chosen randomly from the corresponding $t_m$ values from O. Given a sufficiently large number of future occurrences O', synthetic workload trace generation logic 14 will obtain the same time-varying distribution of demands as in O. This results in a pattern of demands that captures the lows and highs of demand in a representative way. Furthermore, we note that the occurrences may have a trend $\tau$. For the sequence of historical pattern occurrences, synthetic workload trace generation logic 14 normalizes the demand values so that the trend is removed with respect to the last occurrence before constructing O'.

Unfortunately, this approach may not necessarily offer the same required capacity as the original occurrences. To better model required capacity, it becomes desirable to take into account sequences of continuous demands in the trace L. This exemplary embodiment of synthetic workload trace generation logic 14 accomplishes this by randomly selecting blocks of b intervals $t_m, t_{m+1}, \ldots, t_{m+b}$ at a time from the occurrences O. In this way, the synthetically generated traces 15 have contiguous sequences of demand that are similar to the historical trace 11. Preferably, the value b should be larger than the number of intervals in the overload epoch s so that the impact of contiguous demands are fully realized when evaluating required capacity.

Demands $l^{\circ'}(t_m)$ in the synthetic trace are augmented to reflect the trend $\tau$. In this exemplary embodiment, we assume an additive model. For each future occurrence o', synthetic workload trace generation logic 14 computes an absolute value based on $\tau$ that is to be added to each demand in occurrence o'. The further o' is into the future, the greater the change with respect to the historical data, assuming $\tau$ is not zero.

According to one embodiment, the capacity planning analysis steps are repeated using multiple randomly generated instances of L', such as instances $108_1$-$108_N$ of FIG. 1, to better characterize the range of potential behavior for the overall system. Multiple instances better characterize future interactions in demands among multiple workloads. By analyzing a range of possible behaviors we gain insight into the risks of performance degradation.

Finally, a workload pattern P provides a convenient way to express what-if-scenarios and business forecasts that are not observable to us from historic data. Suppose, for example, that we have a pattern P with O occurrences and we require a change to the pattern; then, we can express a change once with respect to P rather than once for each of the possibly many occurrences.

Figure 5:
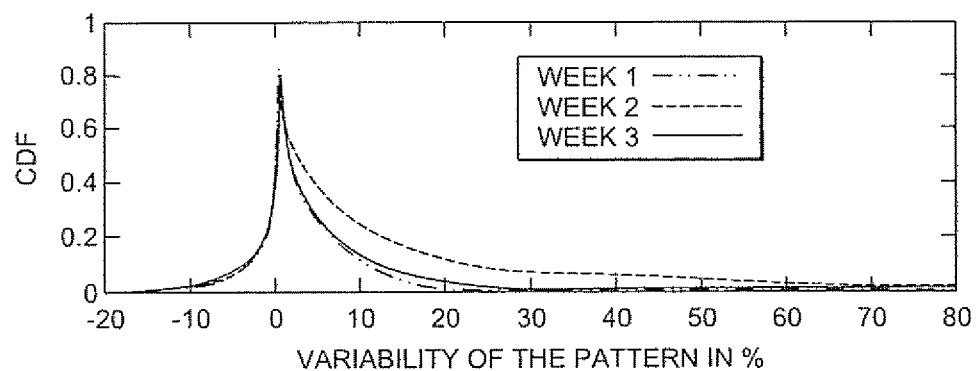
FIG. 5 shows a graph illustrating a cumulative distribution function (CDF) for the differences for 3 weekly occurrences of a weekly pattern in an exemplary case study.

Various techniques may be employed by pattern evaluation logic 17 for evaluating a determined pattern P. An exemplary evaluation technique that is employed according to one embodiment is now briefly described further. To assess the representativeness of a pattern P, one exemplary method considers the distribution of differences between the pattern and its occurrences. For each occurrence o, pattern evaluation logic 17 defines a difference for time interval $t_m$ as $p(t_m)$–$l^{\circ}$ $(t_m)$. The differences for $1 \leq m \leq M$ express the variation of the occurrence o with respect to the pattern. It is expected that occurrences are to have similar variability when the pattern is representative. FIG. 5 shows a cumulative distribution function (CDF) for the differences for 3 weekly occurrences of a weekly pattern in an exemplary case study. These illustrate the distributions i.e. variability, of the differences between an occurrence and its pattern. This FIGURE presents the CDF in a manner slightly different than the usual monotonically increasing curve. In the figure, for illustration purposes alone, we distinguish between differences that are less than zero and those that are greater than zero. A difference less than zero suggests that the demand in the occurrence was more than the corresponding value in the pattern. These are shown with a curve that increases when going from left to right. Differences that are greater than zero are shown with a curve that decreases when going from left to right. FIG. 5 shows that in the second week, demands were typically lower than expected by the pattern in this exemplary case study. This was due to a public holiday on the Thursday of the second week.

According to one embodiment, pattern evaluation logic 17 employs a two-sample Kolmogorov-Smirnov test (KS-test) (see I. Chakravarti, R. Laha, J. Roy. Handbook of Methods of Applied Statistics. Volume 1, John Wiley and Sons, pp. 392-394, 1967) to compare the CDFs of differences for pairs of occurrences. The test informs about differences in the distributions. The KS-test computes a KS statistic which can be used to assess the hypothesis that the two distributions being compared are from the same distribution. Table 1 below shows the results of the KS-tests for each pair of occurrences in this exemplary case study. This test shows us that week 1 and week 3 are more similar to each other than to week 2 in this case study. The KS-values in the table can be compared with the KS critical value of 0.075 for a level of significance α=0.2. A high significance level reduces the risk of accepting that the distributions are similar when they are not. Using the critical value we accept the hypothesis that weeks 1 and 2 have similar distributions at the 0.2 significance level but we reject that week 2 is similar to either week 1 or week 3.

TABLE 1

KS-Values for Pairs of Pattern Occurrences

| CDF | Week 1 | Week 2 | Week 3 |
|---|---|---|---|
| Week 1 | — | 0.135 | 0.043 |
| Week 2 | 0.135 | — | 0.106 |
| Week 3 | 0.043 | 0.106 | — |

The CDF also provides information about the percentiles for the differences. Table 2 below shows several percentiles. For example, 90% of the intervals for the week 1 occurrence had differences of less than 11% with respect to the pattern in this exemplary case study. The percentiles show that week 2 has a much higher variability with respect to the pattern.

TABLE 2

Percentiles of Differences Between Occurrence and Pattern

| | Percentiles | | | | | |
|---|---|---|---|---|---|---|
| CDF | 0.99 | 0.95 | 0.90 | 0.85 | 0.80 | 0.75 | 0.60 |
| Week 1 | 22 | 14 | 11 | 9 | 7 | 6 | 4 |
| Week 2 | 60 | 41 | 22 | 16 | 12 | 10 | 5 |
| Week 3 | 25 | 17 | 13 | 10 | 8 | 7 | 5 |

In this exemplary embodiment pattern evaluation logic 17 regards a pattern as representative for a workload if the KS-test for the different weeks shows that their CDFs describe similar distributions.

An illustrative case study is now further described to further illustrate operation of this exemplary embodiment of pattern evaluation logic 17. As described above, pattern evaluation logic 17 evaluates the representativeness of a pattern using the KS-values for pairs of pattern occurrences. This illustrative case study provides an example of how this notion of representatives can aid in understanding whether a workload has a change in behavior.

Figure 6:
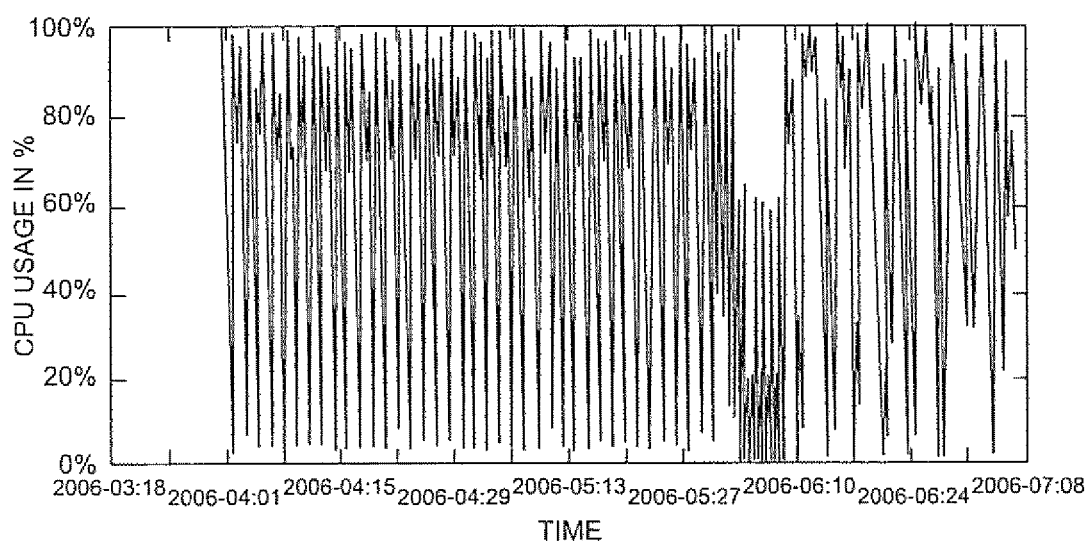
FIG. 6 shows a graph illustrating a 14-week workload demand trace for a workload classified as having a weak pattern over the 14-week timescale that is considered in this case study.

FIG. 6 shows a 14-week workload demand trace for a workload classified as having a weak pattern over the 14-week timescale that is considered in this case study. There is a clear discontinuity in behavior at week 10 and what appear to be three separate patterns.

Figure 7:
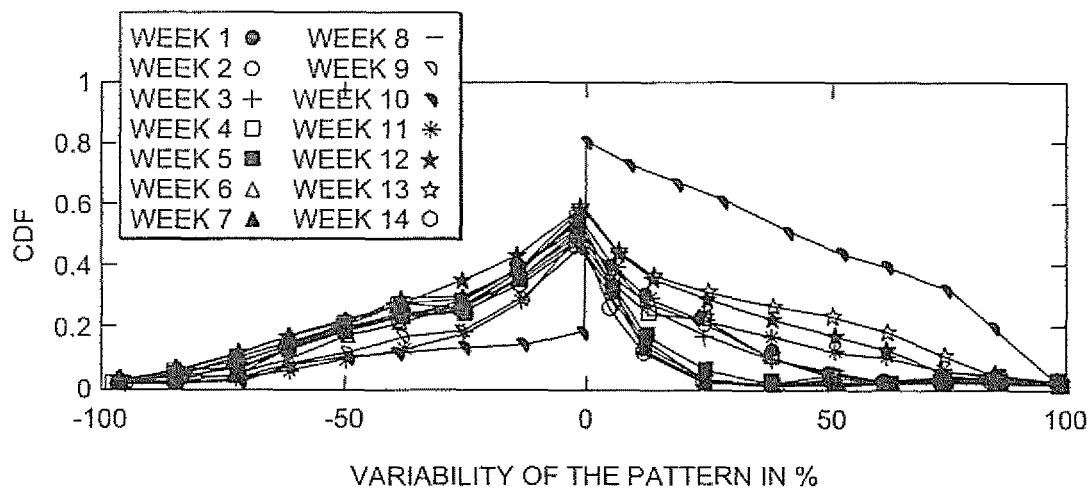
FIG. 7 shows a graph illustrating the CDFs for variability of differences in demand with respect to the overall pattern for each of the 14 weeks for the case study.

The pattern chosen for this workload is influenced heavily by the first 8 weeks of the workload. FIG. 7 shows the CDFs for variability of differences in demand with respect to the overall pattern for each of the 14 weeks. Table 3 below shows KS-test values computed for pairs of weeks.

TABLE 3

KS - Test Values for Pairs of Weeks

| | Week 1-Week 8 | Week 9 | Week 10 | Week 11-Week 14 |
|---|---|---|---|---|
| Week 1 | 0.045-0.064 | 0.136 | 0.609 | 0.193-0.280 |

A summary of the results presented in FIG. 7 and Table 3 for this case study are as follows:
1) The first 8 weeks correspond much more closely to the pattern than the last six weeks. Table 3 shows that weeks one through eight have small KS-values compared to the corresponding critical value for the KS-test which is 0.11 for a significance of 0.2. This leads us to conclude these weeks are similar.
2) Week 10 is not similar to other weeks.
3) Weeks 11 through 14 are somewhat similar to one another, even with respect to the overall pattern.

Furthermore the 80-percentiles of difference for the first eight weeks of this case study are within 30% of the expected value for the pattern, while the 80 percentiles for the last six weeks are greater than 70% of the expected value for the pattern.

To summarize, the classification method employed by this exemplary embodiment of pattern evaluation logic 17 determined that this workload has a weak pattern over the 14 week timescale for the illustrated case study. The definition for representativeness further enabled pattern evaluation logic 17 to recognize chance to the workload over time. Such analysis can be further automated to dynamically adjust a workload's pattern over time and to recognize unexpected changes to a workloads demand. When computing trends, the trend analysis logic may be implemented to ensure that only subsets of data that correspond to a representative pattern are used.

According to certain embodiments, evaluation of the pattern is based on a Chi-square test, instead of the exemplary KS-test described above. A certain amount of variation in demands among occurrences of a pattern is generally expected. These may be due to random user behavior, holidays, etc. However, larger variations may reflect a repurposing of a server or a change in business conditions that affect capacity management. Certain embodiments of the present invention may choose to ignore atypical occurrences when estimating trends for demand or only use the most recent occurrences when estimating future workloads if demands have clearly changed, as examples. An exemplary automated test that is based on the Chi-Square test is employed in certain embodiments for recognizing whether there are significant differences between occurrences of the pattern, and such exemplary automated test method is now briefly described.

Again, the test of this exemplary embodiment is motivated by the Chi-square test (see I. Chakravarti, R. Laha, J. Roy, *Handbook of Methods of Applied Statistics*, vol. I, John Wiley and Sons, pp. 392-394, 1967). It is designed to highlight extreme differences in load behavior. This exemplary test that is employed according to one embodiment of the present invention compares two occurrences of a pattern at a time. For an occurrence o, we define a difference for time interval $t_m$ as $p(t_m)-l^o(t_m)$. The differences for $1 \leq m \leq M$ express the variation of the occurrence o with respect to the pattern. We partition the difference values into three buckets. The three buckets have ranges [−100, 10], (−10, 10], (10, 100], respectively. The differences in the range (−10, 10] are deemed to be inconsequential from a resource pool capacity management perspective. The right and left buckets define more extreme differences from the pattern.

A Chi-square test can be used to determine whether a pair of occurrences, o and o', have statistically similar numbers of observations per bucket. However, we have found that interpreting the computed Chi-square statistic is problematic. The value of the statistic is sensitive to the number of observations in the right and left buckets and the interpretation of the value depends on pattern lengths. Instead, we choose, in this exemplary embodiment, to consider the sum of the absolute differences in counts for the left and right buckets. This sum tells us whether the occurrences differ from the pattern in a similar way. The sum is a count of intervals and can be expressed in terms of the number of minutes per day that the occurrences have differences in extreme behavior.

Table 4 below gives the resulting minutes per day differences in extreme load behavior as computed for the workload in FIG. 4A. Weeks 1 and 3 have difference in extreme behavior of approximately 69 minutes per day. Week 2 differs from the other weeks. It has differences in extreme behavior of 181 and 171 minutes per day as compared with week 1 and week 3, respectively. This is likely due to the holiday that occurred in week 2. In an exemplary case study described below, we consider the impact of alternative values for a threshold that decides whether a pair of occurrences differs significantly in behavior.

TABLE 4

Minutes Per Day of Differences in Extreme Load Behavior

| Minutes Per Day | Week 1 | Week 2 | Week 3 |
|---|---|---|---|
| Week 1 | — | 181 | 69 |
| Week 2 | 181 | — | 171 |
| Week 3 | 69 | 171 | — |

To evaluate the effectiveness of this exemplary Chi-squared based method, a case study was conducted in which six months of workload trace data was obtained for 139 workloads from a data center. The data center in this exemplary case study specialized in hosting enterprise applications such as customer relationship management applications for small and medium sized businesses. Each workload was hosted on its own server, so resource demand measurements for a server were used to characterize the workload's demand trace. The measurements were originally recorded using vmstat and sar. Each trace describes resource usage, e.g., processor and memory demands, as measured every 5 minutes starting Jan. 1, 2006. This exemplary case study considered:

a characterization of the data center's workloads;
results from workload demand pattern analysis;
an analysis of similarity among occurrences of patterns;
a validation of the trending and synthetic workload generation techniques; and
a walk-forward test that employs the pattern matching, trending, and synthetic workload generation methods.

Figure 8:
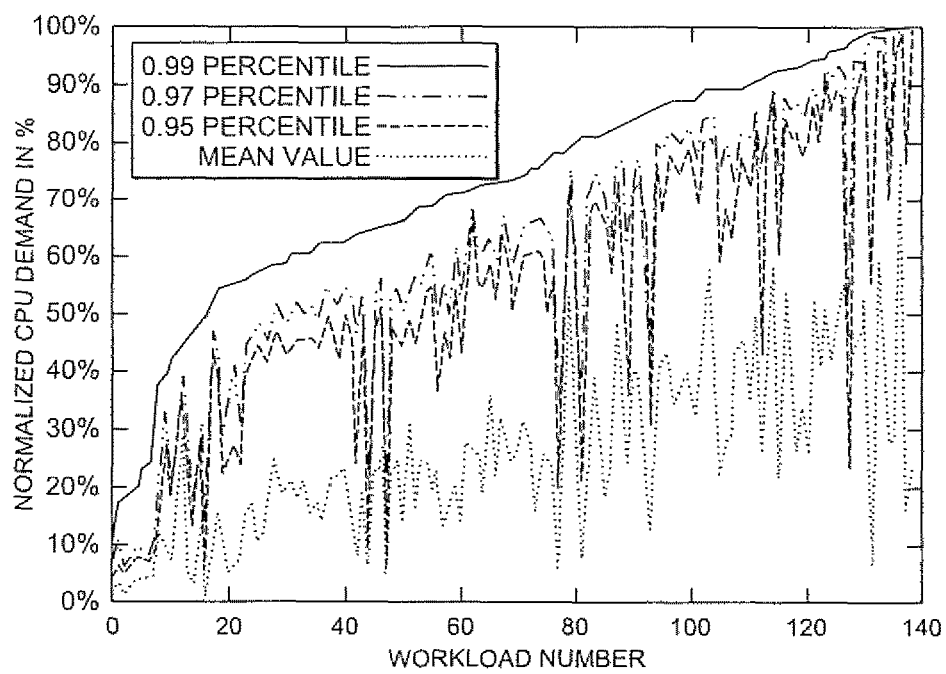
FIG. 8 shows a graph illustrating the percentiles of CPU demand for the 139 applications over a period of 5 weeks for an exemplary case study.

First, we address the nature of the enterprise application workloads under study in this exemplary case study. Our analysis in this exemplary case study shows percentiles of demands and durations for bursts of demands. FIG. 8 shows the percentiles of CPU demand for the 139 applications over a period of 5 weeks for his exemplary case study. We chose to limit the duration to 5 weeks so that we didn't exaggerate the peak demands beyond what we may use as part of the proposed capacity management process. The demands we illustrate are normalized as a percentage with respect to their peak values. Several curves are shown that illustrate the 99th, 97th, and 95th percentile of demand as well as the mean demand (the workloads are ordered by the 99th percentile for clarity). FIG. 8 shows that more than half of all studied workloads have a small percentage of points that are very large with respect to their remaining demands. The left-most 60 workloads have their top 3% of demand values between 10 and 2 times higher than the remaining demands in the trace. Furthermore, more than half of the workloads observe a mean demand less than 30% of the peak demand. These curves show the bursty nature of demands for most of the enterprise applications under study. Consolidating such bursty workloads onto a smaller number of more powerful servers is likely to reduce the capacity needed to support the workloads. An additional and complementary property for a workload is the maximum duration of its contiguous application demands. While a system should be provisioned to handle sustained bursts of high demand, short bursts may not significantly affect the workload's users. For example, if a workload's contiguous demands above the 99th percentile of demand are never longer than 10 minutes then it may be economical to support the workload's 99th percentile of demand and allow the remaining bursts to be served with degraded performance.

Figure 9:
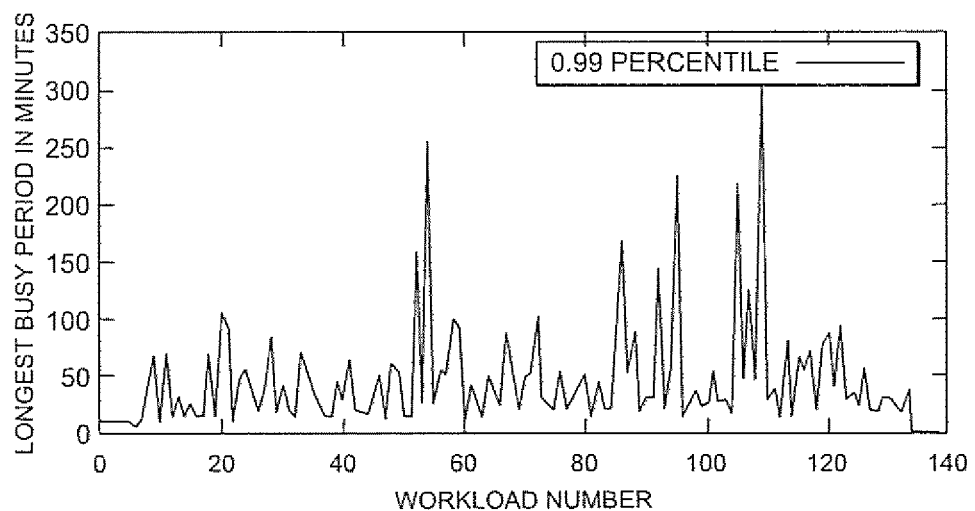
FIG. 9 shows a graph illustrating the maximum duration of the contiguous demands above 99th percentile of the workload demand for this exemplary case study.

FIG. 9 shows the maximum duration of the contiguous demands above 99th percentile of the workload demand for this exemplary case study. FIG. 9 shows that for 50% of the workloads the periods of a high load are very time-limited:

23.7% of the workloads have a longest busy period less than 15 minutes;
34.5% of the workloads have a longest busy period less than 20 minutes;
53.3% of the workloads have a longest busy period less than 30 minutes.

Therefore, for a significant portion of the enterprise applications under study, allowing a time-limited degraded application performance (e.g., up to 30 min.) is likely to offer significant savings in the amount of capacity that must be provisioned.

Figure 10:
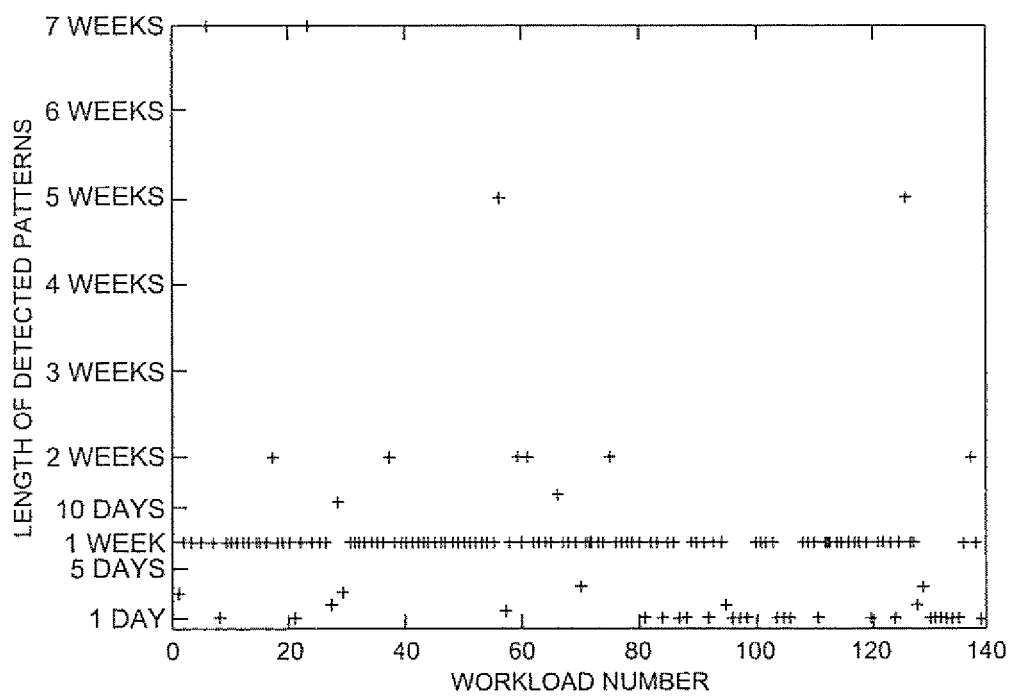
FIG. 10 shows a graph illustrating a summary of the pattern lengths for the 139 workloads of this exemplary case study.

Now we address the general results for the workload pattern analysis conducted in this exemplary case study. The results we present consider workload demand traces from Apr. 1, 2006 to Jul. 8, 2006. To begin, we offer a general overview of the workloads in this exemplary case study. FIG. 10 shows a summary of the pattern lengths for the 139 workloads. The pattern analysis extracts patterns with lengths between three hours and seven weeks:

68% of the workloads exhibit a weekly behavior, and
17% of the workloads exhibit a daily behavior.

We note that not all of the pattern lengths are directly related to a multiple of days, for example one workload exhibits a strong cyclical behavior with a period of 10 days, 10 hours, and 45 minutes. Thus, having knowledge of the patterns can help to recognize when workloads with different pattern durations will have collisions for their larger demands.

Using the clustering algorithm, we classified the 139 patterns in the following way. There were;

31 strong patterns. Most of the 31 strong patterns correspond to batch jobs that exhibit a very distinct cyclic behavior;
76 medium patterns. The medium patterns typically include interactive and/or mixed batch and interactive work;
32 weak patterns. The weak patterns include: i) workloads showing no cyclic behavior, e.g., constant or random demands, ii) workloads that have been interrupted several times, e.g., by intermediate peaks with 100% load each lasting a couple of days, or iii) workloads that changed completely during the duration of the workload trace, e.g., the workload in FIG. 6.

These results suggest that pattern matching methods deduce reasonable patterns for 107 out of 139 cases.

As discussed above, a desire exists for understanding when there are significant differences in a workload's pattern occurrences. Significant differences may cause a pattern to be classified as weak.

FIG. 6, discussed above, again shows a 14-week workload demand trace for a workload classified as having a weak pattern in this exemplary case study. There is a clear discontinuity in behavior at week 10 and what appear to be three separate patterns.

The pattern chosen for this workload is influenced heavily by the first 8 weeks of the workload. FIG. 7 shows a plus-minus CDF for variability of differences in demand with respect to the overall pattern for each of the 14 weeks in this exemplary case study. FIG. 7 shows that there are large differences in the tails of the differences in demand with respect to the pattern. Table 5 below shows the range of minute per day differences in extreme behavior for the occurrences with respect to week 1. Table 5 shows that weeks 1 through 8 have average differences of approximately an hour per day—except for week three which has a difference of 109 minutes per day, while the others have differences of 4 or more hours per day. Thus, the approach utilized in this exemplary case study is able to distinguish such changes in demands across occurrences and can provide insights into why some patterns are classified as weak.

TABLE 5

Range of Minutes per Day of Differences in Extreme Load Behavior

| | Week 2-8 | Week 9 | Week 10 | Week 11-14 |
|---|---|---|---|---|
| Week 1 | 36-66 (109 for week 3) | 241 | 817 | 302-630 |

Figure 11:
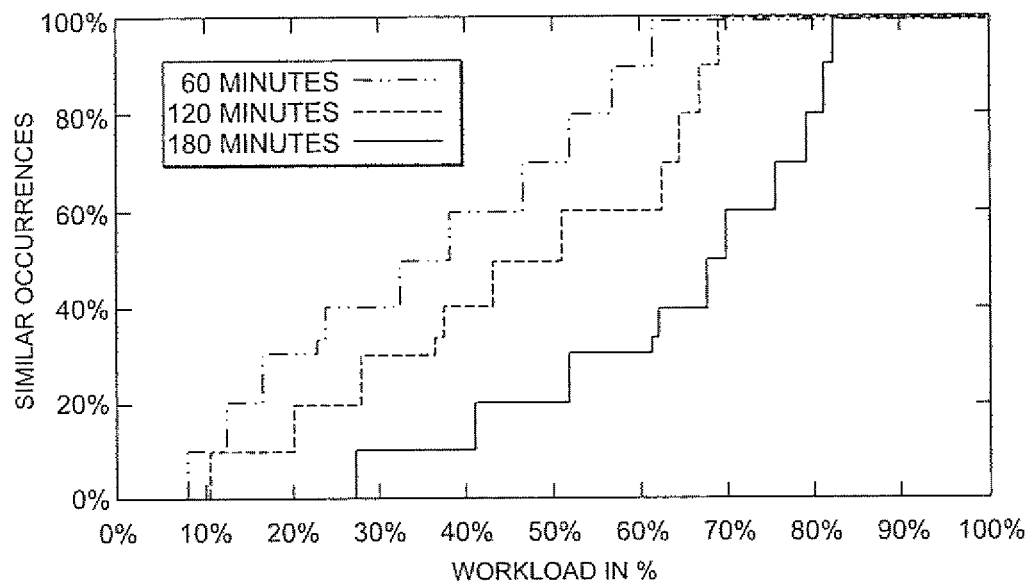
FIG. 11 shows a graph that considers all 139 workloads for a five week analysis period in this exemplary case study, which illustrates the percentage of workloads that have a fraction of occurrences pairs with differences in extreme behavior of less than 60, 120, and 180 minutes per day, respectively.

FIG. 11 shows a graph that considers all 139 workloads for a five week analysis period in this exemplary case study. Five weeks is a typical period for which these methods can be utilized; of course, longer or shorter periods may be analyzed if so desired. FIG. 11 shows the percentage of workloads that have a fraction of occurrences pairs with differences in extreme behavior of less than 60, 120, and 180 minutes per day, respectively. We see that the 120 minute per day scenario has 31% of workloads where all occurrences are similar, and 20% of workloads where no more than 20% of occurrences are similar. This corresponds well to the breakdown of pattern quality we observed from the clustering algorithm described above for these same 5 weeks. The clustering algorithm had 24% strong patterns and 19% weak patterns. It should be noted that the new approach utilized in this exemplary case study allows us classify the quality of a pattern on a per-workload basis, i.e., without the need for clustering. For the 60 minute threshold, only the top 30% of workloads have more than 50% of occurrence pairs being similar. As expected, the 60 minute threshold is more strict causing more pairs of occurrences to be regarded as dissimilar. Likewise, the 180 minute threshold is less restrictive. We chose in this exemplary case study to use the 120 minute threshold because it has a good correspondence with the clustering-based classification system.

A trending analysis performed in this exemplary case study is now briefly described. The approach to trending employed in this exemplary case study assumes an additive model. Historic data is used to estimate the expected change in demand from one occurrence to the next. This change is applied repeatedly when generating synthetic traces for future occurrences. There are a few challenges that arise when applying this method. We now discuss two of the challenges, and how we addressed them in this exemplary case study.

First, public holidays, runaway operating system processes, and failed operating system processes may each influence what is perceived as a trend. Long term trends are less affected by these events. Pattern similarity can warn of occurrences that deviate from the observed pattern, and such occurrences can be excluded from a trend.

Second, sufficient historical data is needed to predict a trend for a period of time into the future. For example, a minimum of two weeks of data are needed to predict a weekly trend. However, short term trends, e.g., on the order of days or weeks, may exist that are not representative of the longer term. For example, the last week of a month may always have greater demands than the first three weeks. Depending on where the historic data starts, trending methods may identify an increasing or decreasing short term trend. These trends exist but each has a particular time into the future for which it is relevant. Significant historical data is needed to capture trends that are on the timescale of quarter years. At these longer timescales applications demands may change, due to new application functionality or software releases, or business conditions may change thereby making such trends less useful. For long timescales business forecasts aim to capture such disruptions. So, it may be desirable for them to be represented in the capacity plan.

Figure 12:
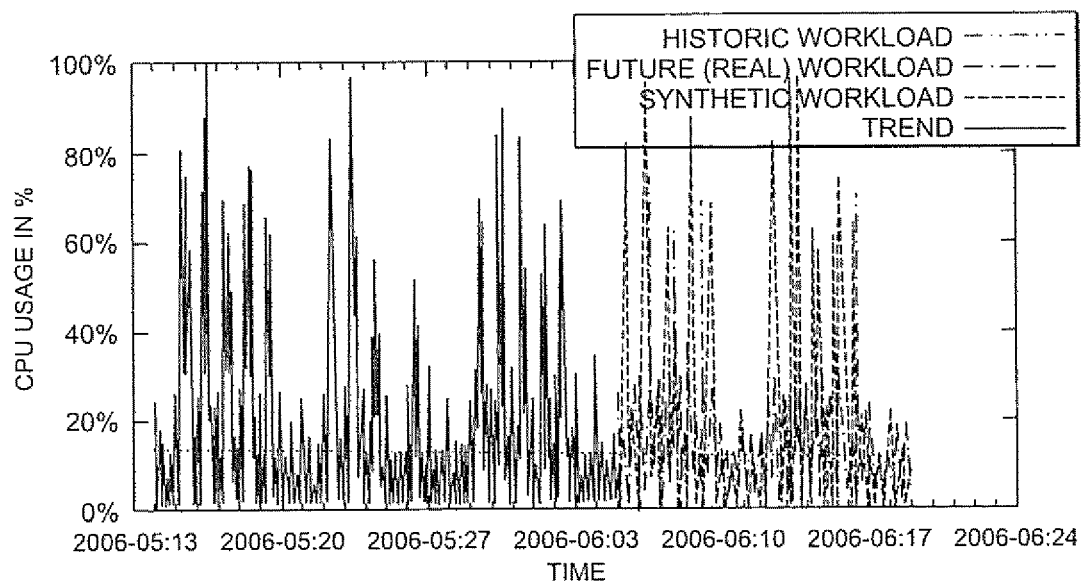
FIG. 12 shows a graph illustrating a workload along with a trend $\tau$ that computed using three weeks of historical data in this exemplary case study.

With knowledge of the above limitations, we can still exploit trending for shorter timescales in the capacity management process. FIG. 12 shows a workload along with a trend $\tau$ that we compute using three weeks of historical data in this exemplary case study. FIG. 12 shows a slowly decreasing trend of −2.3 units of demand per week that correctly anticipates decreasing demands one or two weeks into the future.

We now address the representativeness of a synthetic workload trace generated using the above-described approach for this exemplary case study. We used three weeks of historic data from May 14 through June 4 to generate a synthetic trace for the next two weeks, using trending, and we compared the characteristics with that of the actual workload data for the following two weeks, namely June 5 through June 18. FIG. 12 shows the corresponding historical, synthetic, and future workload demands. The trend is clearly useful at this timescale.

Figure 13:
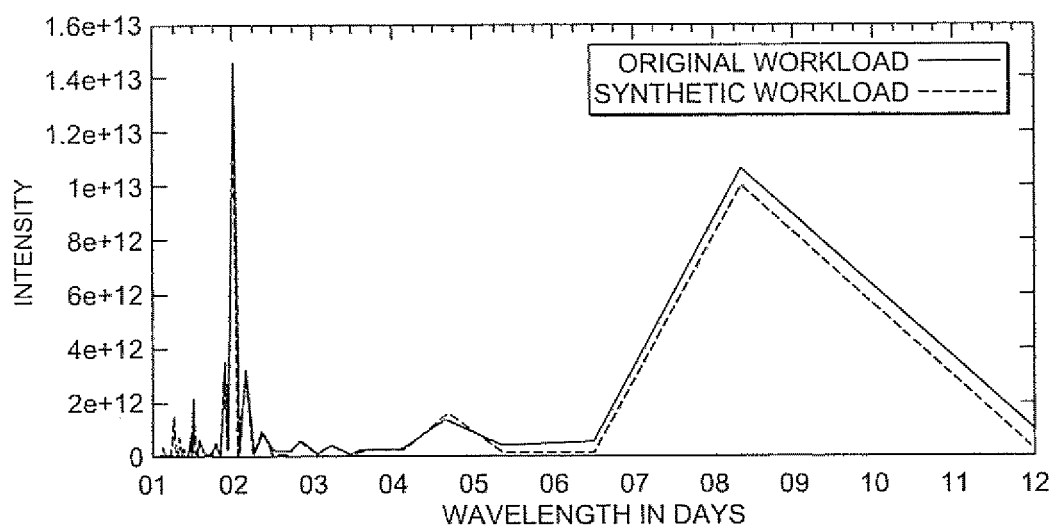
FIG. 13 shows a graph comparing the periodogram of synthetic and original workloads in this exemplary case study.
Figure 14:
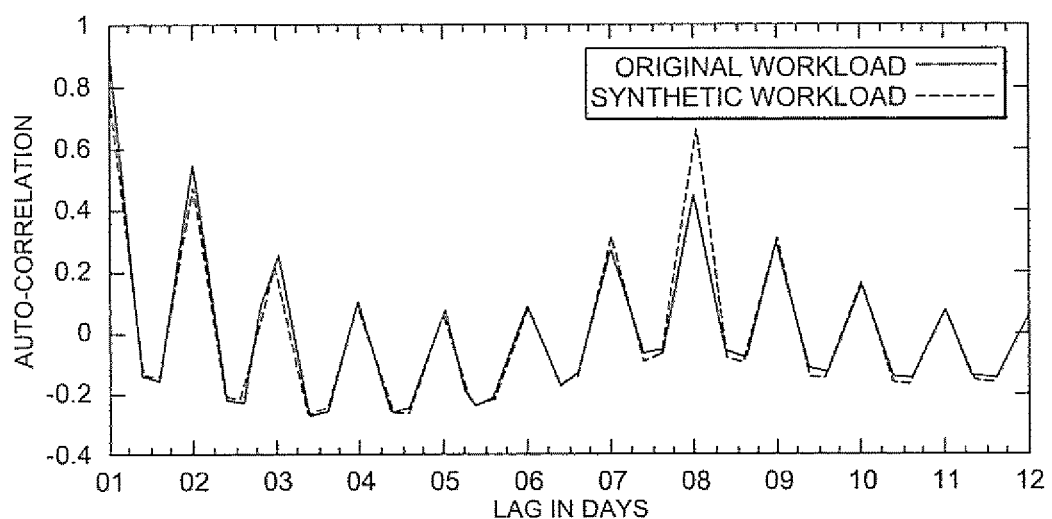
FIG. 14 shows a graph comparing the auto-correlation of synthetic and original workloads in this exemplary case study.

To further assess the representativeness of the synthetic trace as compared with the historic data, we see that FIGS. 13 and 14 show that the periodogram and auto-correlation functions for the two data sets are very similar. Finally, the required capacity values for the historic, synthetic, and actual future workload demands were 508, 455, and 461 units of demand, respectively. The corresponding contiguous bursts of demand that were beyond the 99-percentile were 160, 60, and 35 minutes, respectively. Thus, the synthetic trace has both a similar pattern and required capacity as the actual demand trace it aimed to predict.

Further, in this case study, we exploited the workload demand prediction service as part of the capacity management process. We conducted a walk-forward test over the six months of data to emulate how well our capacity management process would have served the data center for the six months.

Starting with the first week, a window with w weeks of data is used to recommend a consolidated configuration $C_1$, i.e., each workload is assigned to a specific server, for the system. The configuration reports expected capacity values for each server in the configuration. Multiple synthetic traces, in our case thirty, are used to determine a range of estimates for required capacities for each server. The greatest observed required capacity for a server is chosen as the estimate for required capacity of the server.

The next y weeks of data are then simulated with respect to $C_1$. This simulation gives the actual capacity for the next y weeks.

The difference between a server's estimated and actual capacity gives the absolute error for the estimate of capacity.

The negative errors reflect "under-estimated" capacity while the positive errors correspond to "over-estimated" capacity. We use a plus-minus CDF that reflects both types of errors for the walk-forward test.

The steps in the walk-forward test are repeated iteratively with w weeks of data but now starting with weeks 2, 3, and so on.

Let i be the step number in the walk-forward test. Step i computes a new configuration $C_i$ and a new set of differences between estimated and actual required capacity values for each server.

We consider an ongoing process where the workloads are repeatedly consolidated onto a number of powerful servers over time. The servers have 8 processors. In general, the consolidation required 13 to 15 of these servers at a time. To evaluate the effectiveness of workload demand prediction methods we consider several different scenarios for generating synthetic workloads. The scenarios include:

a) use pattern analysis and trending;
   b) use pattern analysis alone;
   c) all workloads are associated with daily pattern; and,
   d) all workloads are associated with a 30 hour pattern (specifically chosen to be incorrect).

Figure 15:
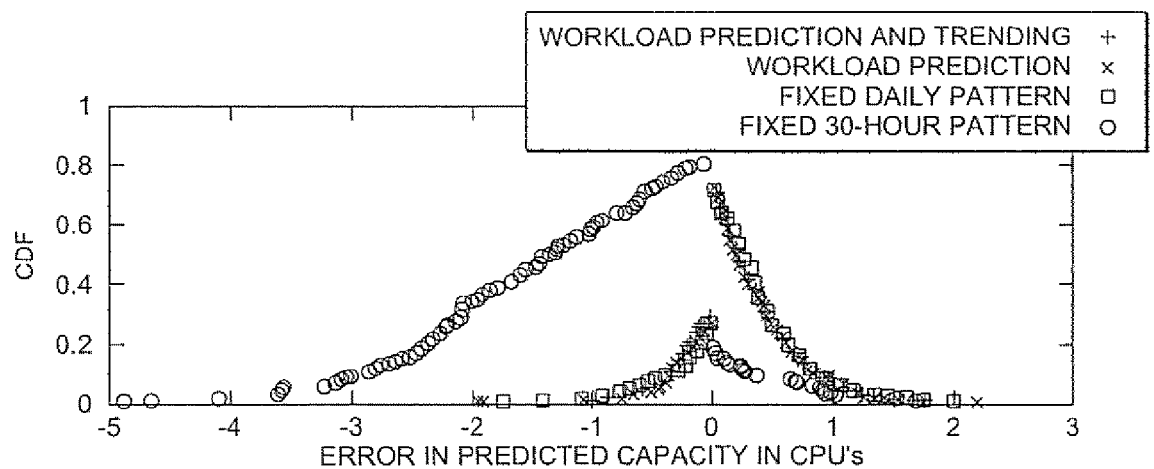
FIG. 15 shows a graph illustrating the results for the one week prediction in this exemplary case study.
Figure 16:
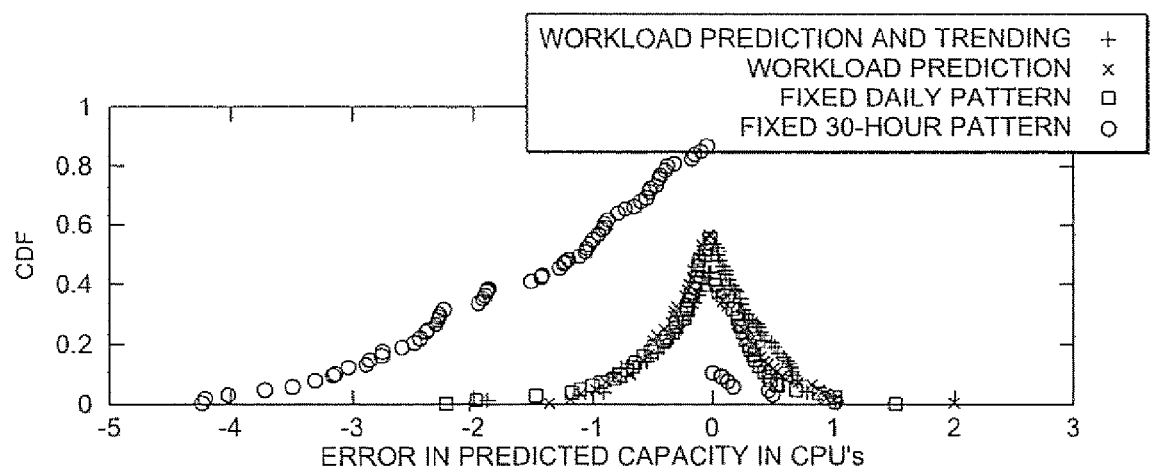
FIG. 16 shows a graph illustrating that the results for predicting required capacity 5 weeks into the future are very similar in this exemplary case study.

For our study we used w=5 weeks of historic input for the process and predicted required capacity y=1 week and y=5 weeks into the future. FIGS. 15 and 16 show CDFs of errors in predictions for required capacity for the scenarios over the entire walk-forward test. A negative error suggests that a method estimates less capacity than is actually required for a server.

FIG. 15 shows the results for the one week prediction. Scenarios a) and b) are pretty much indistinguishable. Trending avoided two large but similar negative errors. A fixed daily pattern without trending, scenario c), caused several larger negative errors than a), i.e., values less than −1 processor. The clearly incorrect 30 hour pattern from scenario d) caused severe errors.

FIG. 16 shows that the results for predicting required capacity 5 weeks into the future are very similar. The only difference is errors were a little lower for scenario b), i.e., without trending, than a) with trending. This is reasonable. Our historic window of 5 weeks of data is not likely to be sufficient for predicting trends 5 weeks into the future for all workloads for all steps in the walk-forward test.

For both 1 week and 5 week predictions, Scenario a) estimates per-server required capacity to within one processor (out of eight processors) 95% of the time.

It should be understood that application of the concepts presented herein are not intended to be limited by the above-described case studies, but rather those are provided as merely illustrative examples that validate that embodiments of the present invention may be successfully employed for evaluating patterns of resource demands and for various other capacity planning tasks.

Figure 17:
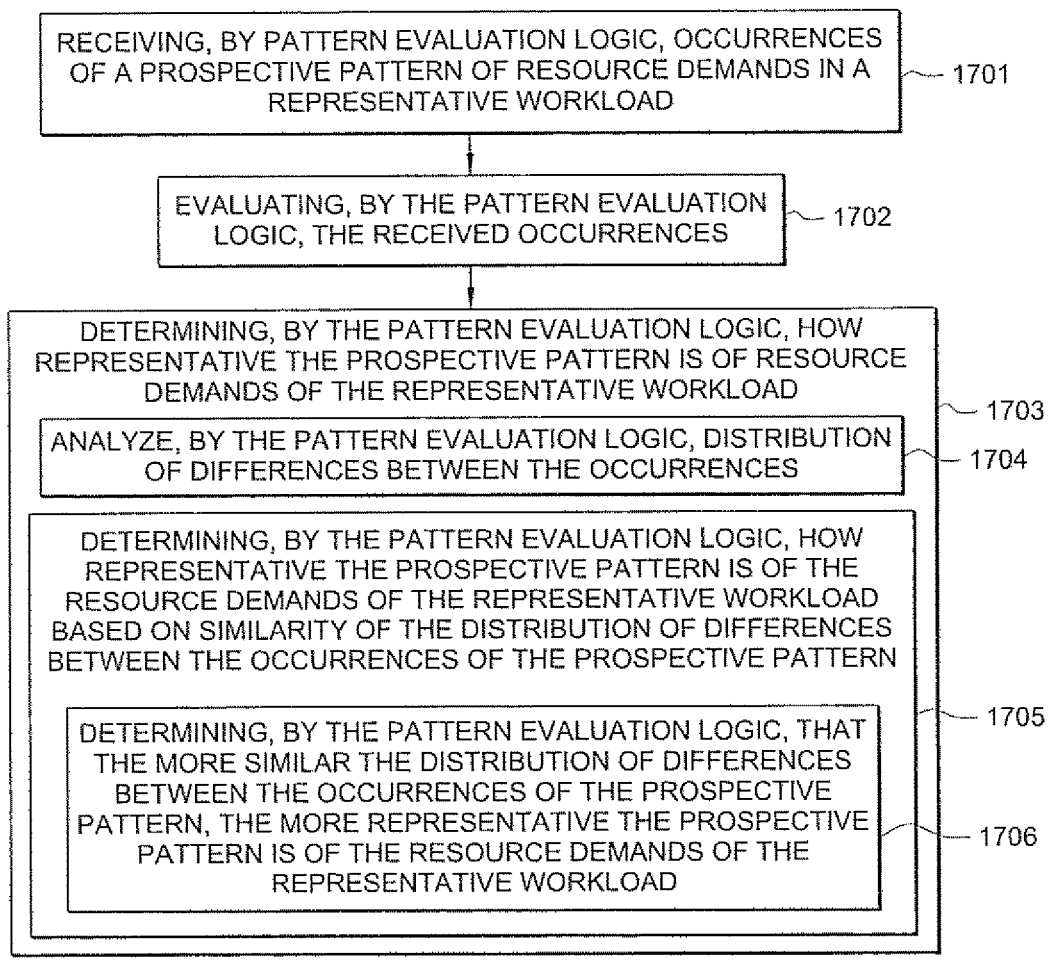
FIG. 17 shows an operational flow diagram according to an embodiment of the present invention.

FIG. 17 shows an operational flow diagram for evaluating a pattern of resource demands of a workload according to one embodiment of the present invention. In this example, pattern evaluation logic 17 receives, in operational block 1701, occurrences of a prospective pattern of resource demands in a representative workload. That is, a pattern P may be identified as a prospective pattern of resource demands of a representative workload 11, wherein such prospective pattern is evaluated to determine how representative such pattern actually is of the workload's resource demands. In operational block 1702, the pattern evaluation logic 17 evaluates the received occurrences, such as occurrences $22_1$-$22_3$ of FIGS. 2-3. In operational block 1703, the pattern evaluation logic 17 determines, based on such evaluation of block 1702, how representative the prospective pattern is of resource demands of the representative workload 11. For example, according to certain embodiments, pattern evaluation logic 17 makes such determination by analyzing the distribution of differences between the occurrences in operational block 1704, and then determining, in operational block 1705, how representative the prospective pattern is of the resource demands of the representative workload 11 based on similarity of the distribution of differences between the occurrences of the prospective pattern. In certain embodiments, the pattern evaluation logic 17 determines, in operational block 1705, that the more similar the distribution of differences between the occurrences of the prospective pattern, the more representative the prospective pattern is of the resource demands of the representative workload 11.

Figure 18:
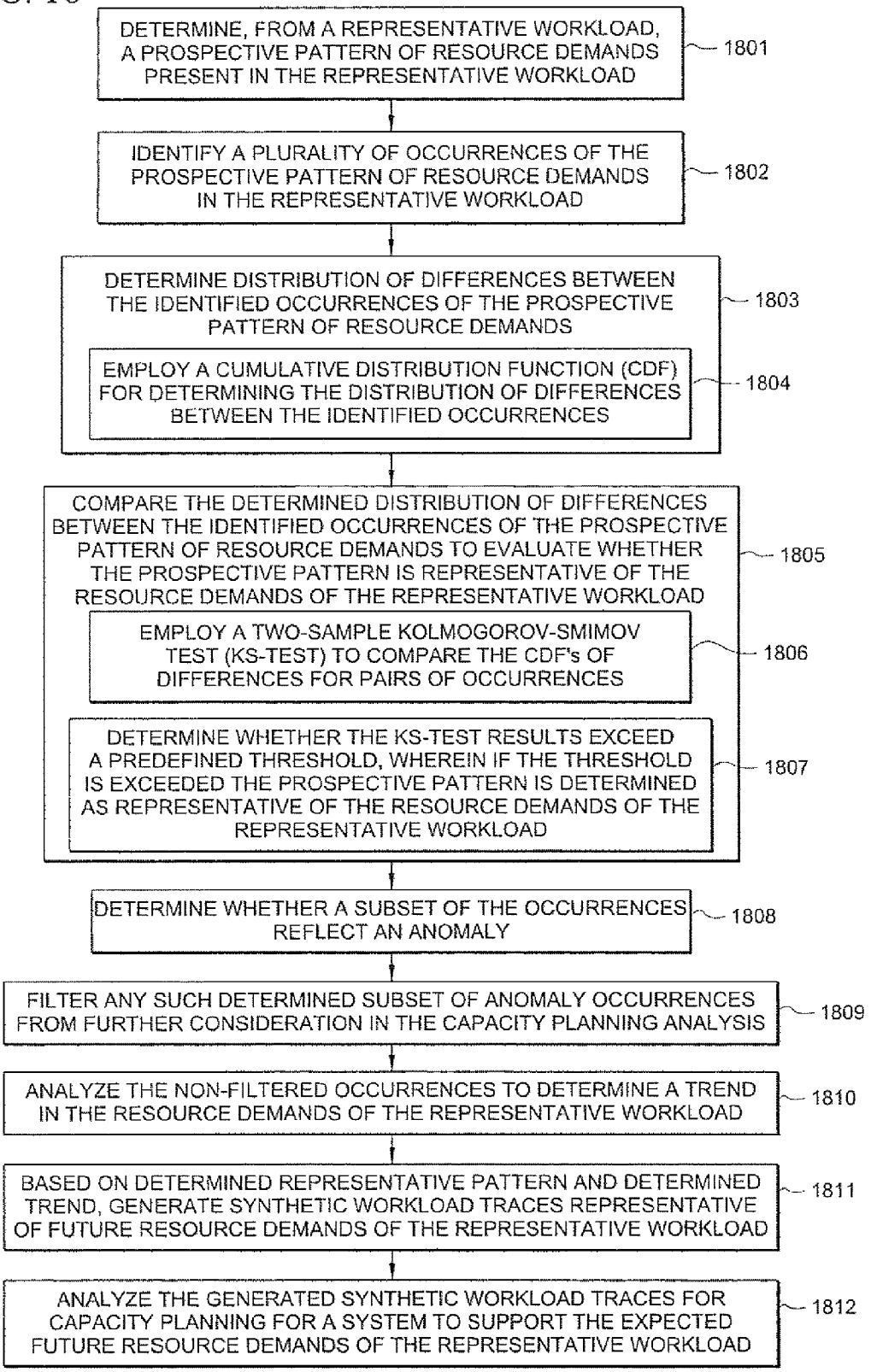
FIG. 18 shows another exemplary operational flow diagram according to an embodiment of the present invention.

FIG. 18 shows an operational flow diagram according to another embodiment of the present invention. In operational block 1801, pattern analysis logic 12 determines, from a representative workload 11, a prospective pattern "P" of resource demands present in the representative workload 11. In operational block 1802, a plurality of occurrences "O" of the prospective pattern "P" are identified in the representative workload 11. In operational block 1803, pattern evaluation logic 17 determines a distribution of differences between the identified occurrences of the prospective pattern of resource demands. In doing so, in certain embodiments, the pattern evaluation logic 17 employs a CDF for determining the distribution of differences between the identified occurrences, in operational block 1804.

In operational block 1805, pattern evaluation logic 17 compares the determined distribution of differences between the identified occurrences of the prospective pattern of resource demands to evaluate whether the prospective pattern is representative of the resource demands of the representative workload 11. In doing so, in certain embodiments, pattern evaluation logic 17 employs a two-sample KS-test to compare the CDFs of differences for pairs of occurrences, in operational block 1806, and then determines in operational block 1807 whether the KS-test results exceed a pre-defined threshold, wherein if the threshold is exceeded the prospective pattern "P" is determined as representative of the resource demands of the representative workload 11.

In operational block 1808, pattern evaluation logic 17 further determines whether a subset of the occurrences of pattern "P" reflect an anomaly. And, in operational block 1809, pattern evaluation logic 17 filters any such determined subset of anomaly occurrences from further consideration in the capacity planning analysis. In operational block 1810, trend analysis logic 13 analyzes the non-filtered occurrences of pattern "P" to determine a trend in the resource demands of the representative workload 11. In operational block 1811, synthetic workload trace generation logic 14 generates, based on the determined representative pattern P and determined trend information, synthetic workload traces 15 that are representative of expected future resource demands of the representative workload 11. Then, in operational block 1812, capacity planning analysis logic 16 analyzes the generated synthetic workload traces 15 for capacity planning for a system that is to support the expected future resource demands of the representative workload 11.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 19:
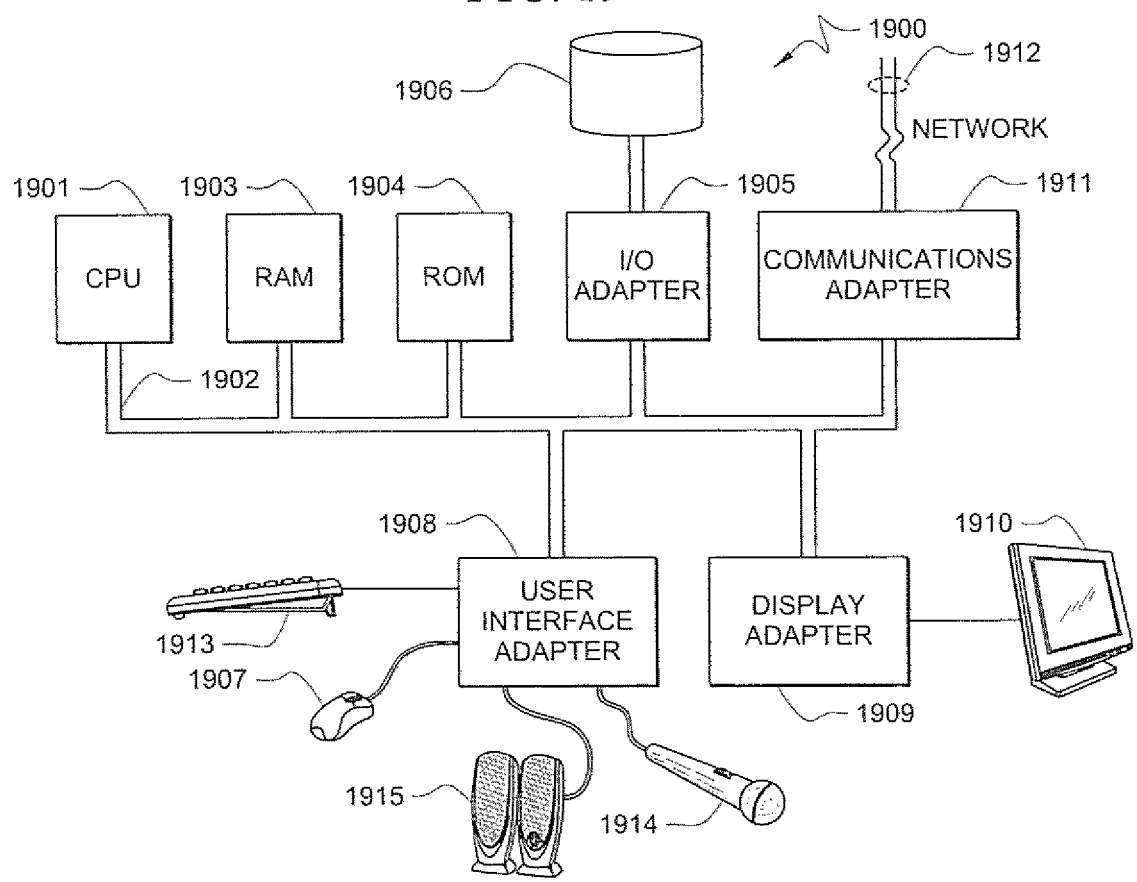
FIG. 19 shows an exemplary system on which certain embodiments of the present invention may be implemented.

FIG. 19 illustrates an exemplary computer system 1900 on which various elements of embodiments of the present invention, such as pattern analysis logic 12, trend analysis logic 13, synthetic workload trace generation logic 14, capacity planning analysis logic 16, and/or pattern evaluation logic 17, may be implemented according to certain embodiments of the present invention. Central processing unit (CPU) 1901 is coupled to system bus 1902. CPU 1901 may be any general-purpose CPU. The present invention is not restricted by the architecture of CPU 1901 (or other components of exemplary system 1900) as long as CPU 1901 (and other components of system 1900) supports the inventive operations as described herein. CPU 1901 may execute the various logical instructions according to embodiments of the present invention. For example, CPU 1901 may execute machine-level instructions according to the exemplary operational flows described above in conjunction with FIG. 17-18.

Computer system 1900 also preferably includes random access memory (RAM) 1903, which may be SRAM, DRAM, SDRAM, or the like. Computer system 1900 preferably includes read-only memory (ROM) 1904 which may be PROM, EPROM, EEPROM, or the like. RAM 1903 and ROM 1904 hold user and system data and programs, as is well known in the art.

Computer system 1900 also preferably includes input output (I/O) adapter 1905, communications adapter 1911, user interface adapter 1908, and display adapter 1909. I/O adapter 1905, user interface adapter 1908, and/or communications adapter 1911 may, in certain embodiments, enable a user to interact with computer system 1900 in order to input information.

I/O adapter 1905 preferably connects to storage device(s) 1906, such as one or more of hard drive, compact disc (CD) drive, floppy disk drive, tape drive, etc. to computer system 1900. The storage devices may be utilized when RAM 1903 is insufficient for the memory requirements associated with storing data for operations of the pattern analysis logic 12, trend analysis logic 13, synthetic workload trace generation logic 14, capacity planning analysis logic 16, and/or pattern evaluation logic 17. Communications adapter 1911 is preferably adapted to couple computer system 1900 to network 1912, which may enable information to be input to and/or output from system 1900 via such network 1912 (e.g., the Internet or other wide-area network, a local-area network, a public or private switched telephony network, a wireless network, any combination of the foregoing). User interface adapter 1908 couples user input devices, such as keyboard 191', pointing device 1907, and microphone 1914 and/or output devices, such as speaker(s) 1915 to computer system 1900. Display adapter 1909 is driven by CPU 1901 to control the display on display device 1910 to, for example, display information pertaining to capacity planning analysis, according to certain embodiments of the present invention.

It shall be appreciated that the present invention is not limited to the architecture of system 1900. For example, any suitable processor-based device may be utilized for implementing pattern analysis logic 12, trend analysis logic 13, synthetic workload trace generation logic 14, capacity planning analysis logic 16, and/or pattern evaluation logic 17, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
receiving, by pattern evaluation logic implemented in a computer processor, a plurality of occurrences of a prospective pattern of resource demands in a representative workload;
evaluating, by the pattern evaluation logic, the received occurrences of the prospective pattern of resource demands; and
determining, by the pattern evaluation logic, based on said evaluation of the received occurrences of the prospective pattern of resource demands, how representative the prospective pattern is of resource demands of the representative workload by analyzing a distribution of differences between the occurrences of the prospective pattern of resource demands.

2. The method of claim 1 wherein said determining further comprises:
determining how representative the prospective pattern is of the resource demands of the representative workload based on determined similarity of the distribution of differences between the plurality of occurrences of the prospective pattern.

3. The method of claim 2 wherein said determining further comprises:
determining that the more similar the distribution of differences between the occurrences of the prospective pattern, the more representative the prospective pattern is of the resource demands of the representative workload.

4. The method of claim 1 wherein each occurrence of the prospective pattern comprises a plurality of resource demand measurement intervals.

5. The method of claim 4 wherein said evaluating the received occurrences of the prospective pattern of resource demands comprises:
determining differences between corresponding ones of said plurality of resource demand measurement intervals of a plurality of different occurrences of the prospective pattern.

6. The method of claim 5 wherein said evaluating further comprises:
determining a distribution of the determined differences between the plurality of occurrences of the prospective pattern of resource demands.

7. The method of claim 1, further comprising:
determining a distribution of differences between the occurrences of the prospective pattern of resource demands; and
evaluating said prospective pattern based at least in part on a determined distribution of differences between the identified occurrences of the prospective pattern.

8. The method of claim 7 wherein said determining said distribution of differences comprises:
employing a cumulative distribution function (CDF) for determining the distribution of differences between the identified occurrences of the prospective pattern.

9. The method of claim 8 wherein said evaluating comprises:
comparing the determined distribution of differences between the identified occurrences of the prospective pattern of resource demands.

10. The method of claim 9 wherein said evaluating comprises:
  evaluating whether the prospective pattern is representative of the resource demands of the representative workload.

11. The method of claim 10 further comprising:
  employing a two-sample Kolmogorov-Smirnov test (KS-test) to compare the CDFs of differences for pairs of occurrences of the prospective pattern of resource demands.

12. The method of claim 11 further comprising:
  determining whether the KS-test results exceed a pre-defined threshold, wherein if the pre-defined threshold is exceeded, the prospective pattern is determined as representative of the resource demands of the representative workload.

13. The method of claim 10 further comprising:
  employing a Chi-squared based test to compare the CDFs of differences for pairs of occurrences of the prospective pattern of resource demands.

14. The method of claim 7 further comprising:
  determining whether a subset of the occurrences of the prospective pattern reflect an anomaly.

15. The method of claim 14 further comprising:
  determining, based on occurrences of the prospective pattern that do not reflect an anomaly, a trend in the resource demands of the representative workload.

16. The method of claim 1, in which determining how representative the prospective pattern is of resource demands of the representative work load includes determining a measure of the representativeness by analyzing a distribution of differences between the occurrences of the prospective pattern of resource demands.

17. A method comprising:
  receiving, by pattern evaluation logic implemented in a computer processor, a plurality of occurrences of a prospective pattern of resource demands in a representative workload;
  evaluating, by the pattern evaluation logic, the received occurrences of the prospective pattern of resource demands; and
  determining, by the pattern evaluation logic, based on said evaluation of the received occurrences of the prospective pattern of resource demands, how representative the prospective pattern is of resource demands of the representative workload by: analyzing a distribution of differences between the plurality of occurrences of the prospective pattern of resource demands, and determining that the more similar the distribution of differences between the occurrences of the prospective pattern, the more representative the prospective pattern is of the resource demands of the representative workload.

18. The method of claim 17, wherein said evaluating the received occurrences of the prospective pattern of resource demands comprises:
  determining differences between corresponding ones of said plurality of resource demand measurement intervals of a plurality of different occurrences of the prospective pattern; and
  determining a distribution of the determined differences between the plurality of occurrences of the prospective pattern of resource demands.

19. A method comprising:
  receiving, by pattern evaluation logic implemented in a computer processor, a plurality of occurrences of a prospective pattern of resource demands in a representative workload;
  evaluating, by the pattern evaluation logic, the received occurrences of the prospective pattern of resource demands;
  determining, by the pattern evaluation logic, based on said evaluation of the received occurrences of the prospective pattern of resource demands, how representative the prospective pattern is of resource demands of the representative workload; wherein determining how representative the prospective pattern is of resource demands comprises determining a distribution of differences between the occurrences of the prospective pattern of resource demands using a cumulative distribution function (CDF), comparing the determined distribution of differences between the identified occurrences of the prospective pattern of resource demands, and evaluating whether the prospective pattern is representative of the resource demands of the representative workload by employing a two-sample Kolmogorov-Smirnov test (KS-test) to compare the CDFs of differences for pairs of occurrences of the prospective pattern of resource demands.

20. The method of claim 19, further comprising:
  determining whether the KS-test results exceed a pre-defined threshold, wherein if the pre-defined threshold is exceeded, the prospective pattern is determined as representative of the resource demands of the representative workload.

21. The method of claim 20, further comprising:
  employing a Chi-squared based test to compare the CDFs of differences for pairs of occurrences of the prospective pattern of resource demands.

* * * * *